(12) United States Patent
Wong et al.

(10) Patent No.: US 12,561,643 B2
(45) Date of Patent: Feb. 24, 2026

(54) AUTOMATED RETAIL STORE AND SYSTEM

(71) Applicant: Shoalter Automation Limited, Hong Kong (CN)

(72) Inventors: Wai Kay Wong, Hong Kong (CN); Chi Kong Lau, Hong Kong (CN); Yuet Mei Tsang, Hong Kong (CN); Chiu Yuen Yeung, Hong Kong (CN); Lok Hei Leung, Hong Kong (CN); Wai Kin Wong, Hong Kong (CN); Clement Chek Bong Cheung, Hong Kong (CN)

(73) Assignee: Shoalter Automation Limited, Hong Kong (CN)

( * ) Notice: Subject to any disclaimer, the term of this patent is extended or adjusted under 35 U.S.C. 154(b) by 275 days.

(21) Appl. No.: 18/044,933

(22) PCT Filed: Nov. 1, 2021

(86) PCT No.: PCT/CN2021/127961
§ 371 (c)(1),
(2) Date: Mar. 10, 2023

(87) PCT Pub. No.: WO2023/010700
PCT Pub. Date: Feb. 9, 2023

(65) Prior Publication Data
US 2023/0342713 A1 Oct. 26, 2023

(30) Foreign Application Priority Data

Aug. 4, 2021 (HK) ........................... 22021036045.3

(51) Int. Cl.
*G06Q 10/087* (2023.01)
*G05B 15/02* (2006.01)
(Continued)

(52) U.S. Cl.
CPC ........... *G06Q 10/087* (2013.01); *G05B 15/02* (2013.01); *G06Q 10/0835* (2013.01);
(Continued)

(58) Field of Classification Search
CPC ............. G06Q 10/087; G06Q 10/0835; G06Q 30/0633; G06Q 10/0836; G05B 15/02;
(Continued)

(56) References Cited

U.S. PATENT DOCUMENTS 9,679,326 B2 * 6/2017 Elberbaum ............... H04L 5/14
10,482,420 B1 11/2019 Brooks et al.
(Continued)

FOREIGN PATENT DOCUMENTS

AU 2003213489 A1 8/2003
CN 105049528 A 11/2015
(Continued)

OTHER PUBLICATIONS

National Intellectual Property Administration, PRC International Searching Authority, International Search Report and Written Opinion, Apr. 26, 2022, 7 pages.
(Continued)

*Primary Examiner* — Jeffrey A. Smith
(74) *Attorney, Agent, or Firm* — Haynes and Boone, LLP

(57) ABSTRACT

An automated retail store system for providing automated storage of multiple items and scheduled handling of a customer order for said items at a single retail site, including: a store control system adapted to operate under the control of control signals generated based on order information for an order by a customer, said order information including information representing one or more items and a pickup time; a plurality of storage channels for storing different respective items; a retrieval system adapted to operate under the control of said store control system to:
(Continued)

retrieve a plurality of said items in said order information from said channels, and place a plurality of said retrieved items into a delivery container; a conveyor system adapted to operate under the control of said store control system to: move said delivery container to either a storage rack or a locker compartment based on said pickup time, and move said delivery container from said storage rack to an available said locker compartment based on said pickup time; and a verification system adapted to operate under the control of said store control system to: verify an identity of said customer or a unique identifier for said order, and allow said customer to access said items in said locker compartment only when said identity or said identifier has been successfully verified.

21 Claims, 23 Drawing Sheets

(51) Int. Cl.

| | | |
|---|---|---|
| *G06Q 10/0835* | (2023.01) | |
| *G06Q 30/0601* | (2023.01) | |
| *G07C 9/32* | (2020.01) | |
| *G07C 9/38* | (2020.01) | |

(52) U.S. Cl.
CPC ........... *G06Q 30/0633* (2013.01); *G07C 9/32* (2020.01); *G07C 9/38* (2020.01)

(58) Field of Classification Search
CPC ......... G07C 9/32; G07C 9/38; B65G 1/1373; B65G 1/0407; G07F 11/004; G07F 11/165; G07F 17/12
See application file for complete search history.

(56) References Cited

U.S. PATENT DOCUMENTS

| | | | |
|---|---|---|---|
| 10,872,312 B2 * | 12/2020 | Maifeld | ............. G06Q 30/0635 |
| 2001/0042024 A1 | 11/2001 | Rogers | |

| | | | |
|---|---|---|---|
| 2010/0169190 A1 * | 7/2010 | Allison | ................ G06Q 10/087 |
| | | | 705/28 |
| 2012/0303154 A1 | 11/2012 | Stiernagle | |
| 2017/0270472 A1 | 9/2017 | High | |
| 2019/0066041 A1 * | 2/2019 | Hance | .................... B65G 1/137 |
| 2020/0334625 A1 | 10/2020 | Li | |
| 2020/0349794 A1 | 11/2020 | Belte | |
| 2020/0387857 A1 * | 12/2020 | Smith | .................... G06Q 20/18 |
| 2021/0133668 A1 | 5/2021 | Mikayelyan | |
| 2023/0274827 A1 * | 8/2023 | Wang | ..................... G16H 15/00 |
| | | | 705/2 |

FOREIGN PATENT DOCUMENTS

| | | | | | |
|---|---|---|---|---|---|
| EP | 1211622 A2 | 6/2002 | | | |
| GB | 2486067 A | 6/2012 | | | |
| JP | 2021111148 A | 8/2021 | | | |
| WO | WO-2018165444 A1 * | 9/2018 | .......... G06Q 10/087 | | |
| WO | 2019051505 A1 | 3/2019 | | | |
| WO | 2019132766 A1 | 7/2019 | | | |
| WO | 2019242695 A1 | 12/2019 | | | |
| WO | 2021003208 A1 | 1/2021 | | | |

OTHER PUBLICATIONS

Patents Registry, Intellectual Property Department—The Government of the Hong Kong Special Administrative Region, "Examination Notice", Reference No. 22021036045.3, Jan. 28, 2025, 13 pages.

European Patent Office, "Communication Pursuant to Article 94(3) EPC", Application No. 21205830.9, Jan. 29, 2025, 7 pages.

IP Australia, Examination Report No. 1, Application No. 2021459230, Apr. 11, 2024, 6 pages.

Patents Registry, Intellectual Property Department, the Government of the Hong Kong Special Administrative Region, Examination Notice of Standard Patent, Application No. 22021036045.3, Jan. 29, 2024, 11 pages.

\* cited by examiner

Detail A

Detail B

2500 start

Generate stock-rearrangement instructions    2502

Retrieval system to retrieve selected items and place in container    2504

Move container to sorting system    2506

Restocking system to place selected items to a selected new storage channel    2508 end

AUTOMATED RETAIL STORE AND SYSTEM

This application is a national phase application of PCT/CN2021/127961, filed Nov. 1, 2021, which claims priority to and the benefit of Hong Kong application Ser. No. 22021036045.3, filed Aug. 4, 2021, both of which are incorporated herein in their entireties.

FIELD

The present invention relates to an unmanned store, and in particular, an automated storage and retailing system for providing scheduled handling of customer orders at a single retail site (e.g. at a shop location or retail facility).

BACKGROUND

Retail stores are an essential part of our society, allowing consumers to easily purchase goods they need for everyday life. However, the density of items stocked in a typical store is not efficiently optimised. For example, the height of shelves is typically only the reachable height of a typical customer, and extra aisle space needs to be reserved for customer walkways. Thus, the physical and space constraints of a store places limitations on the range, quantity and type of items that the store can offer to customers, and also affects the customer's shopping experience.

As customers adapt to changing circumstances and priorities, customer purchaser behaviour has evolved with a growing emphasis on availability, flexibility and convenience. In particular, customers value the choice of buying from a wide range of quality items, receiving their purchased items as soon as possible, and to make a purchase in a way (and at a time) that is easy and most convenient for the customer. Traditional physical stores run by staff can only satisfy some of these objectives. For example, it is almost impossible to run a store continuously 24 hours a day without needing extra staff, which adds to cost.

Online shopping sites provide an alternative shopping experience. Customers can remotely order from a wide selection of items (anywhere and at any time) through an online shopping platform. However, some human involvement is still required in the fulfilment process (e.g. to pick, pack or deliver the ordered items), which if not properly managed, can result in errors or delay.

Various automated shop solutions have been proposed. For example, Robomart Inc. has created an autonomous grocery store on wheels that offers customers the ability to pick their own groceries at home checkout-free. But the variety of groceries are limited by vehicle size and this retail business is limited by the traffic development of the city, for instance, underdeveloped roads and busy traffic. Amazon Go and 7-Eleven Signature are examples of stores that have automated the check-out process. It offers customers to walk around the shop, select and purchase groceries without requiring a cashier system. But it still requires manpower to refill, re-stock groceries to shelves and to remove the expired groceries from shelves.

Various kinds of automated convenience store have also been proposed, which generally are either robotic vending machines or vending machines that are integrated with a number of robotic components. It only offers customers instant shopping service to pick their items (e.g. soft drinks, groceries), but still requires manpower to re-stock groceries to shelves and to remove the expired groceries from shelves.

The present invention aims to address one or more of the above problems.

SUMMARY OF THE INVENTION

According to one aspect of the present invention, there is provided a retail system including:

an online ordering system for receiving an order from a customer;

a plurality of automated retail store systems located at different retail sites, each said automated retail store system being adapted to store a variety of different items;

a retail management system for receiving, from said online ordering system, order information relating to said order, and based on said order information, controlling the operation of a said automated retail store system selected by said customer for said order; and wherein the selected said automated retail store system, under the control of said retail management system, is configured to retrieve one or more stored items corresponding to the items identified in said order information, and at a scheduled time before a pickup time specified in said order information, place the retrieved items into a locker compartment that is only accessible after verification of said customer.

According to another aspect of the present invention, there is provided an automated retail store system for providing automated storage of multiple items and scheduled handling of a customer order for said items at a single retail site, including:

a store control system adapted to operate under the control of control signals generated based on order information for an order by a customer, said order information including information representing for one or more items and a pickup time;

a plurality of storage channels for storing different respective items;

a retrieval system adapted to operate under the control of said store control system to: retrieve a plurality of said items in said order information from said channels, and place a plurality of said retrieved items into a delivery container;

a conveyor system adapted to operate under the control of said store control system to: move said delivery container to either a storage rack or a locker compartment based on said pickup time, and move said delivery container from said storage rack to an available said locker compartment based on said pickup time; and a verification system adapted to operate under the control of said store control system to verify an identity of said customer or a unique identifier for said order, and allow said customer to access said items in said locker compartment only when said identity or said identifier has been successfully verified.

Preferably, the automated retail store system is adapted to make use of an innovative rack storage system, robotics, 3D-vision, locker system, and backend software to sort, store, retrieve, restock merchandise items as well as to manage inventory of the system.

According to another aspect of the present invention, there is provided a retail site having an automated retail store system as described above.

According to another aspect of the present invention, there is provided a retail management system including:

a processor adapted to communicate with one or more automated retail store system (as described above) by sending control signals and receiving of response signals via a communications network;

wherein said control signals include information for controlling one or more of the operations performed by a particular said automated retail store system; and wherein said response signals includes information representing a state, status or request relating to one or more of the operations performed by said automated retail store system.

The present invention differs from both the vending machine automated store, and the above mentioned automated retail concept. This present invention requires neither service personnel nor cashiers in the store, the purchase orders are completed by smartphone-related technologies and automation is applied to replace the traditional features of a store.

The present invention is truly unmanned, robotic and fully-automated to recognize, sort, refill, re-stock all groceries into the pre-defined shelves and are stored as first-in first-out (FIFO) principle. All purchased/ordered groceries are retrieved from different shelves and are gathered to the customer e-locker using fully automated robotic technology.

On store stock management, the unmanned store periodically performs stock check on all the stock in the system. Items which have expired (or are close to expiry) can be automatically retrieved from shelves to a reject container box automatically.

BRIEF DESCRIPTION OF THE DRAWINGS

Representative embodiments of the present invention are described herein, by way of example only, with reference to the accompanying drawings, wherein.

DETAILED DESCRIPTION OF THE REPRESENTATIVE EMBODIMENTS

Figure 1:
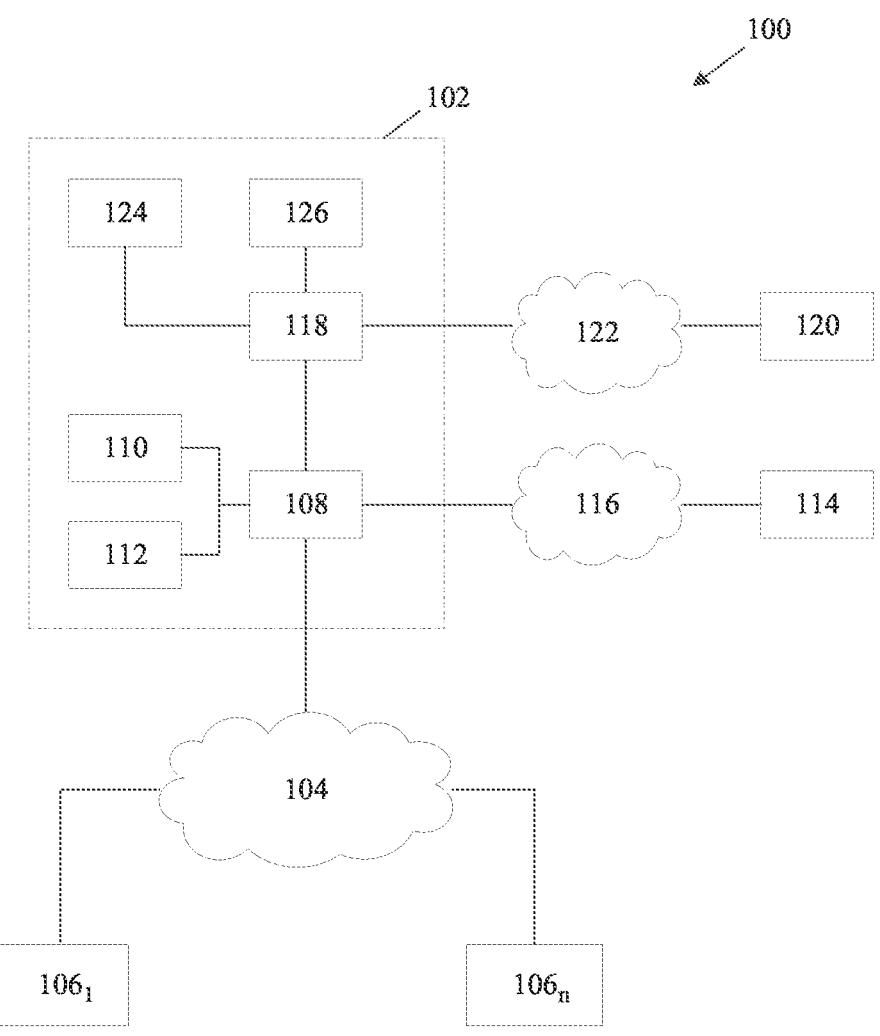
FIG. 1 is a block diagram of a retail system including a retail management system for controlling a plurality of automated retail store systems.

FIG. 1 is a block diagram of a retail system 100 according to a representative embodiment of the present invention. The retail system 100 comprises of a retail management system 102 that communicates with and controls one or more automated retail store systems $106_1$ to $106_n$ over a communications network 104. Each automated retail store system 106 is setup at a single retail site and may be configured to operate as a single autonomous automated store. Preferably, each retail site is at a different location that is physically spaced apart from each other. A retail site refers to a physical location at which items from a single automated retail store system 106 can be purchased and retrieved. For example, a single automated retail store 106 may be configured to operate within a predefined retail space (such as the space in commercial premises that can be used to operate a traditional shop or store). The physical components of each automated retail store system 106 can be configured to maximise the use of such retail space.

In this specification, a communications network (e.g. 104, 116, 122) refers to any means of wired or wireless data communications between two or more electronic devices (e.g. between the retail management system 102 and automated retail store system 106). For example, the communications network 104 may include one or more of a public network (e.g. the Internet), a private network (e.g. a virtual private network), a wide area network (WAN), public switched telephone network (PSTN), a mobile telecommunications network (e.g. a GSM™, CDMA™, UMTS™, LTE™, LTE-A™ network), and a direct physical connection or communications channel that enable data communications between different electronic devices. In FIG. 1, items 104, 116, 122 may refer to different communications networks, or to different communication paths over the same communications network.

According to one aspect of the present invention as shown in FIG. 1, there is provided a retail management system 102 configured for receiving customer orders via a communications network. The retail management system 102 is also configured for controlling one or more automated retail store systems 106 to fulfil such customer orders in the manner described below.

According to a representative embodiment of the invention as shown in FIG. 1, the retail management system 102 may include the following components: an automated retail store management system 108, an inventory material exchange system (IMAX) 110, an order information exchange system (OIX) 112, one or more courier client devices 114, an online shopping platform 118, one or more customer client devices 120, a user management system 124 and an electronic payment system 126. These components may be configured to implement one or more of the following features described below according to different exemplary aspects of different representative embodiments of the present invention.

According to one exemplary embodiment, the retail management system 102 includes an online shopping platform 118 that is configured to provide an online store (or online ordering system). The online shopping platform 118 includes a content management system (CMS) (including a management platform) for providing an online store from which customers can browse items that customers can order from the online store, and browse sales promotions relating to one or more of such items. The online shopping platform 118 communicates with one or more customer client devices 120 (e.g. a personal electronic device such as a mobile phone, computing tablet or personal computer) which a customer uses to interact with the online shopping platform 118. A customer may control an application (e.g. an online shopping application or web browser) on the customer client device 120 to view and order items from the online shopping platform 118. For example, this may involve the customer providing user input to the application on the customer client device 120 for requesting information on one or more items from the online shopping platform 118. The online shopping platform 118 is configured to respond such a request by providing item information to the application, which the application uses to generate a user interface display on the customer client device 120 to present information on the one or more requested items that can be ordered via the online shopping platform 118. The application on the customer client device 120 is configured to receive further user input from the customer representing a selection of one or more items that the customer wishes to order using the online shopping platform 118. Such items can be items from either a specific automated retail store system 106 that is adapted to store a variety of different items and/or from a network of one or more supply warehouses or physical retail stores (together referred to as the supply warehouse) from which such the ordered items can be shipped.

In the context of the present invention, an item refers to a physical object that can be ordered from an automated retail store system 106. For example, an item could be any consumable product that is independently packaged as a single unit that can be individually transported, retrieved and/or dispensed (e.g. a carton of milk, a canned beverage, a bag of rice, etc.). In the context of the present invention, an order represents a set of one or more items that a customer has selected and purchased using the online shopping platform 118.

According to one representative embodiment of the invention, in the process of the customer placing an order via the online shopping platform 118, the customer may select to browse items and/or order items only from a selected automated retail store system 106. In such a scenario, the online shopping platform 118 may be configured to perform a stock availability checking process to determine the items and their current quantities available at the selected automated retail store system 106. The online shopping platform 118 may be configured so that (based on the stock availability checking process) customers can only order quantities of items that are actually available at the selected automated retail store system 106. For example, if the selected automated retail store system 106 has only six units of a particular item, the combined orders from one or more customers for that item from the selected automated retail store 106 must not exceed six units for that particular item. Preferably, the stock availability checking process is performed when the online shopping platform 118 generates and provides item information in response to a request (e.g. from a customer client device 120) for information on one or more items from the online shopping platform 118. The stock availability checking process may be also be performed during (or at any time before) a customer attempts to add a selected quantity of a selected item to the customer's order. The online shopping platform 118 will require the customer to provide a pickup time at which the customer will retrieve the ordered items from the selected automated retail store 106.

Alternatively, according to another representative embodiment, the online shopping platform 118 may be configured such that customers are not limited to ordering quantities of items that are actually available at the selected automated retail store system 106 at the time of placing the order. Instead, the combined orders from customers for a particular item from the selected automated retail store 106 may exceed the actual quantity of such items at the selected automated retail store 106. The online shopping platform 118 may be configured to perform a stock availability checking process as described above. If the online shopping platform 118 receives a customer's order where the required quantity for an ordered item exceeds the actual quantity of that item at the selected automated retail store 106 (e.g. determined by the stock availability checking process), the online shopping platform 118 may be configured to retrieve a restocking time estimate (e.g. generated by the automated retail store management system 108) representing an estimated amount of time required for restocking at least the required quantity of the ordered item to the selected automated retail store system 106. The online shopping platform 118 may be configured to perform a pickup time checking process to determine whether the pickup time provided by the customer would occur before the time required to restock at least the required quantity of the ordered item to the selected automated retail store system 106, and if so, the online shopping platform 118 may be configured to prompt the customer to select a later pickup time.

According to yet another representative embodiment of the invention, in the process of the customer placing an order via the online shopping platform 118, the customer may browse and/or order any items available via the online shopping platform 118 (i.e. not limited to items available from any particular automated retail store system 106). The online shopping platform 118 may be configured to perform a stock availability checking process to determine the items and their current quantities available at the supply warehouse. In such a scenario, the online shopping platform 118 is configured so that the quantities of items that can be ordered correspond to the quantities of those items actually available from the supply warehouse.

According to yet another representative embodiment of the invention, in the process of the customer placing an order via the online shopping platform 118, the customer may order items using an approach described in any one or more of the above representative embodiments. For example, some of the ordered items (e.g. items which a customer requires urgently) may be ordered for pickup from a selected automated retail store system 106, while the remaining ordered items (e.g. less urgent or bulky items) are ordered for delivery from the supply warehouse to the customer.

In the above scenarios, the stock availability checking process involves the online shopping platform 118 communicating with the automated retail store management system 108 to determine (e.g. based on stock data retrieved from the IMAX 110) a quantity of a selected item that is currently available at a selected automated retail store system 106 or in the supply warehouse. The IMAX 110 includes a database that stores stock data representing a currently available quantity (e.g. number of units) of each item at a particular supply location (e.g. an automated retail store system 106 or the supply warehouse). Preferably, each item is represented by a unique item identifier (e.g. item number). Preferably, each supply location is represented by a unique store or location identifier (e.g. a store number). The IMAX 110 manages the inventory of items in each of the automated retail stores system 106 and also the inventory items in a network of one or more supply warehouses or physical retail stores (collectively referred to as a supply warehouse). The automated retail store management system 108 communicates with the IMAX 110 to send and receive stock movement information of inventory from all (or at least one or more of) the automated retail store systems 106 of the retail system 100.

In the process of placing an order using the online shopping platform 118, the customer uses a customer client device 120 to select one or more items to be ordered, which are temporarily added to a virtual shopping cart such that the selected items are associated with a unique identifier for the customer's order. Once a customer has finished selecting the items to be order, the online shopping platform 118 generates and transmits order information to the automated retail store management system 108. Preferably, the order information for each customer order includes one or more of the following:

(i) a unique item identifier and a required quantity for each item in the order;

(ii) a unique store identifier for a selected automated retail store system 106 that is associated with any of the items in the order that are ordered from the selected automated retail store system 106 (e.g. if the customer has indicated they would like to pick up ordered items from the selected automated retail store system 106);

(iii) a pickup time associated with the order (e.g. if the customer has indicated they would like to pick up ordered items from the selected automated retail store system 106);

(iv) customer identification information (e.g. a user id); and (v) a unique identifier associated with the order (e.g. order number).

Preferably, according to one representative embodiment, any items in the order that are associated with a unique store identifier are treated as an order for items from the selected automated retail store system 106 associated with that unique store identifier. This association is determined based on customer input provided in the process of the customer placing an order via the online shopping platform 118. The selected automated retail store system 106 will retrieve such ordered items before the pickup time, an example of which will be described in more detail below.

Preferably, according to one representative embodiment, any items in the order that are not associated with a unique store identifier are treated as an order for items from the supply warehouse. This is also determined based on customer input provided in the process of the customer placing an order via the online shopping platform 118. Such items will be fulfilled by the supply warehouse and shipped to a delivery location specified by the customer.

The online shopping platform 118 communicates with the user management system 124 to carry out a customer verification process. According to one representative embodiment of the invention, this verification process preferably begins by the online shopping platform 118 providing the customer identification information (e.g. a unique user identification number obtained based on input from the customer and/or information received from a customer client device 120 controlled by the customer) to the user management system 124 to verify an identity of the customer. The verification process may request further verification information from the customer (e.g. ask the customer to provide a username and/or password associated with the user identification number, request the customer to provide a confirmation code sequence or click on a verification URL link that has been separately sent to a previously verified email address or mobile phone number of the customer). Once an identity of the customer has been verified, the online shopping platform 118 communicates with the customer client device 120 to obtain payment information from the customer for the ordered items. The customer may provide payment information (e.g. credit card number) via the customer client device 120, or alternatively, direct the online shopping platform 118 to retrieve such payment information stored as part of a user profile in association with the customer's identification information. The online shopping platform 118 then communicates with the electronic payment system 126 to process the customer's payment information for the items ordered.

According to one representative embodiment of the invention, after the electronic payment system 126 has successfully processed the customer's payment information for the order, the online shopping platform 118 sends the order information to the automated retail store management system 108 to process the order. The automated retail store management system 108 provides centralised control of all (or at least one or more of) the automated retail store systems 106 of the retail system 100. The automated retail store management system 108 is configured to perform one or more of the following operations: (i) analyse order information received from the online shopping platform 118; (ii) generate, based on the order information received, control data and/or signals representing one or more executable jobs for each automated retail store systems 106; (iii) calculate the restock quantities and schedules for all (or at least one or more of) the automated retail store systems 106 of the retail system 100; (iv) serve as a communications bridge between the automated retail store systems 106 of the retail system 100 and any outside systems.

If the automated retail store management system 108 determines that the received order information for a customer's order includes one or more ordered items to be picked up from a selected automated retail store system 106, the automated retail store management system 108 generates (based on the order information) control data and/or signals representing one or more control messages for controlling one or more operations performed by the selected automated retail store system 106. Each control message includes information representing one or more predefined executable jobs, where each executable job refers to a set of one or more instructions and/or control signals for controlling the operation(s) of one or more internal components of the selected automated retail store system 106 to perform a predetermined task (or alternatively, a predetermined sequence of multiple predetermined tasks). For example, an executable job may include instructions and/or control signals for controlling a store control system 300 to control the retrieval system 320 to retrieve a specified quantity of a particular item from the corresponding storage channel of storage shelf 316*a*, 316*b*, 318*a*, 318*b* and place the retrieve item(s) into one or more available (e.g. empty) delivery containers. Another executable job may be for controlling the store control system 300 to control the conveyor system 310 to move a delivery container to an available compartment in the storage rack 304 or customer locker compartment 306. Another executable job may be for controlling the store control system 300 to control a state of an access barrier for providing access to a customer locker compartment 306.

The automated retail store management system 108 sends the generated one or more control messages to the selected automated retail store system 106 identified in the order information. The store control system 300 of the selected automated retail store system 106, in response to receiving the order information, controls the operation of one or more internal components of the selected automated retail store system 106 to perform one or more specific actions (e.g. mechanical actions, receive sensor data input etc.) corresponding to each predetermined task in each executable job. For example, based on the control message(s) received, the selected automated retail store system 106 may be controlled to retrieve the items identified in the order information and place the retrieved items into one or more delivery containers for the customer to pickup from the selected automated retail store system 106 before (e.g. by or within a predetermined period of time before) the pickup time indicated in the order information.

According to one representative embodiment of the invention, the automated retail store management system 108 may determine (e.g. based on stock data received from the IMAX 110 and/or response messages received from the store control system 300 of a selected automated retail store system 106) whether a selected automated retail store system 106 does not have all of the ordered items, or does not have sufficient quantities of one or more ordered items, or request one or more items to be restocked in the system 106 (i.e. shortfall items). Based on the above data/messages, the automated retail store management system 108 determines an availability of one or more of such shortfall items from an alternative supply location such as the supply warehouse and/or from one or more other automated retail store systems 106 proximate to (e.g. with a predetermined travel time or travel distance from) the selected automated retail store system 106.

For example, according to a representative embodiment of the invention:

a) If the automated retail store management system 108 determines that one or more of the shortfall items are available from the supply warehouse, the automated retail store management system 108 determines a time period for retrieving the shortfall items from the supply warehouse and for a courier to deliver such shortfall items to a locker compartment 308 of the selected automated retail store system 106.

b) If the automated retail store management system 108 determines that one or more of the shortfall items are available from one of the proximate automated retail store systems 106, the automated retail store management system 108 determines a time period for retrieving the shortfall items from that location and for a courier to deliver such shortfall items to a locker compartment 308 of the selected automated retail store system 106.

c) If the automated retail store management system 108 determines that one or more of the shortfall items are all available from one or more of the proximate automated retail store systems 106 (preferably prioritising proximate automated retail store systems with the least travel distance to the selected automated retail store system), the automated retail store management system 108 determines a time period for retrieving assigned quantities of the shortfall items from those locations (which together make up the quantity of the shortfall items in the order) and for a courier to deliver such shortfall items to a locker compartment 308 of the selected automated retail store system 106.

d) If the automated retail store management system 108 determines that one or more of the shortfall items are all available from the supply warehouse and one or more of the proximate automated retail store systems 106 (preferably prioritising proximate automated retail store systems with the least travel distance to the selected automated retail store system), the automated retail store management system 108 determines a time period for retrieving assigned quantities of the shortfall items from those locations (which together make up the quantity of the shortfall items in the order) and for a courier to deliver such shortfall items to a locker compartment 308 of the selected automated retail store system 106.

The automated retail store management system 108 then selects one or more of the above delivery options (a), (b), (c) or (d) that can deliver the shortfall items to the selected automated retail store system 106 before the pickup time in the order information. The automated retail store management system 108 then further selects one or more of the selected delivery options based on predetermined criteria (e.g. based on item availability in, delivery time from, and/or travel distance from the alternative supply location for each selected delivery option), and for each delivery option generates suborder information for the supply warehouse and/or the relevant automated retail store system 106 to retrieve the required quantities of the order items to fulfil the customer's order. Each said suborder information may include a scheduled pickup time (set before the pickup time in said order) for a courier to pickup from the alternative supply location the items retrieved based on the suborder information by the scheduled pickup time, and load these items into the selected automated retail store system 106 before the pickup time.

The automated retail store management system 108 also generates delivery instructions that are transmitted to a courier client device 114. The delivery instructions configure the courier client device 114 (e.g. through a courier application installed on the courier client device 114) to display delivery information for a courier to pickup the shortfall items from the locations identified in selected delivery option, and deliver these items to the selected automated retail store system 106 before the pickup time in the order information selected by the customer.

If the automated retail store management system 108 determines (e.g. based on stock data for a particular item received from the IMAX 110, and/or response messages received from a selected automated retail store system 106 representing a restock request for one or more specific item(s) or indicating a quantity of a specific item in that store 106) that a quantity of any particular item at the selected automated retail store system 106 is less than a predetermined threshold stock level for that item, the automated retail store management system 108 generates and sends to the supply warehouse a restock request message containing restock order information representing one or more items (and a restocking quantity for each such item) for restocking the selected automated retail store system 106. For example, the threshold stock level may be a predetermined quantity of an item (e.g. a minimum number of units or percentage of stock) that should be available at the selected automated retail store system 106. The restocking quantity of an item may be determined based on information obtained from the IMAX 110, such as a current quantity of that item available at the selected automated retail store system 106 and/or a predetermined (e.g. maximum) quantity of that item which can be stored at the selected automated retail store system 106. Preferably, the automated retail store management system 108 determines whether restocking of any items at a selected automated retail store system 106 is required (in the manner described above) on a periodic basis (e.g. on a daily or weekly basis or according to a predetermined schedule).

When the supply warehouse is ready to deliver the items specified in a restock request message (referred to as restock items) to the selected automated retail store system 106, the supply warehouse updates the information stored in the OIX 112 to include details of the restock items delivered from the supply warehouse to the selected automated retail store system 106 (referred to as a restock delivery).

The automated retail store management system 108 may generate restocking instructions that are sent to the courier client device 114 of a courier assigned to deliver the restock items to the selected automated retail store system 106. The restocking instructions may include: (i) delivery information for configuring a user interface of a courier client device 114 (e.g. through a courier application installed on the courier client device 114) to display directions or instructions for a courier to pickup and deliver specific restocking items to the selected automated retail store system 106; and/or (ii) item organisation information for configuring a user interface of a courier client device 114 (e.g. through a courier application installed on the courier client device 114) to display to the courier directions or instructions for preparing or reorganising one or more of the items being delivered for restocking the selected automated retail store system 106. For example, if the OIX 112 indicates that a restock delivery includes two 6-packs of soft drink, but the selected automated retail store system 106 only requires 8 units of the soft drink to be restocked, the reorganised item information (in this example) could include directions or instructions for the courier to disassemble the two 6-packs of soft drink and only provide the required number of units for restocking that item at the selected automated retail store system 106. The item organisation information for each item in a restock delivery may be generated based on a quantity of that item at the selected store 106 (obtained from the IMAX 110) and the quantity and packaging of the restock items being delivered to the selected automated retail store system 106 in a restock delivery (obtained from the OIX 112).

The courier application on the courier client device 114 also provides an interface for providing the one or more of the following kinds of instructions to a courier (e.g. based on information from the automated retail store management system 108, IMAX 110 and/or OIX 112): (i) sorting and/or organising the restock items in different delivery or restocking containers; (ii) remote control to operate an access barrier (e.g. a door) to a locker compartment at an automated retail store system 106; and (iii) to retrieve containers (e.g. delivery containers, restocking containers, reject containers, etc.) and items from an automated retail store system 106 back to the supply warehouse.

The courier application can interact with different systems of the retail management system 102 as follows: (i) receive, from the automated retail store management system 108, restock order information to execute a restock delivery; (ii) send reorganised item information to the automated retail store management system 108 for updating the IMAX 110 (where the courier provides reorganised item information representing a quantity or number of units of each restock item actually provided to restock a particular automated retail store system 106); (iii) send instructions to the automated retail store management system 108 for operating an access barrier of an automated retail store system 106; and (iv) receive instructions from the automated retail store management system 108 to return containers and related items to the warehouse.

According to one representative embodiment of the invention, if the automated retail store management system 108 receives a request from a specific automated retail store system 106 to restock a particular item, or determines that after fulfilling a particular customer order a particular item in a specific automated retail store system 106 will need to be restocked, the automated retail store management system 108 sends a restock request message to the supply warehouse representing one or more items to be restocked.

Preferably, when the supply warehouse receives a restock request message from the automated retail store management system 108, the supply warehouse arranges the purchase of additional items for the supply warehouse, or to retrieve existing items stored in the supply warehouse corresponding to the items identified in the restock request message. The automated retail store management system 108 manages the restocking of items for each automated retail store system 106 based on information received from the OIX 112. The OIX 112 communicates with an inventory management system of the supply warehouse and provides an interface for the automated retail store management system 108 to receive updates on status of items identified in the restock message that have been ordered. The OIX 112 may generate and send a restock response message to the automated retail store management system 108 based on the restock order information (e.g. setting out the items in the restock request message that have been ordered or retrieved, delivery dates of ordered items, etc.). The OIX 112 may generate and send a response message to the automated retail store management system 108 when the items in the restock request message have arrived (or have been retrieved) and are ready for delivery to a specified automated retail store system 106. The automated retail store management system 108, in response to receiving such a restock response message from the OIX 112, may then generate delivery information that are transmitted to a courier client device 114. The delivery information configures the courier client device 114 to display delivery directions or instructions for a courier to pickup the items to be restocked from the supply warehouse and deliver to a specified automated retail store system 106.

Preferably, the automated retail store management system 108, IMAX 110, OIX 112, online shopping platform 118, user management system 124, electronic payment system 126 and store control system 300 may each be implemented by one or more data processing or control components on separate servers, or on the same server. Each such component may be implemented either in the form of: (i) one or more software modules corresponding to a set of computer-readable instructions stored in memory 206 for controlling the operation of a processor 204 to implement methods and processes according to the present invention; or (ii) data processing circuitry/components (e.g. a microcontroller, ASIC or FPGA) adapted to implement methods and processes according to the present invention; or (iii) a combination of software modules and data processing circuitry/components as described above that work in cooperation with each other to implement the methods and processes according to the present invention.

Figure 2:
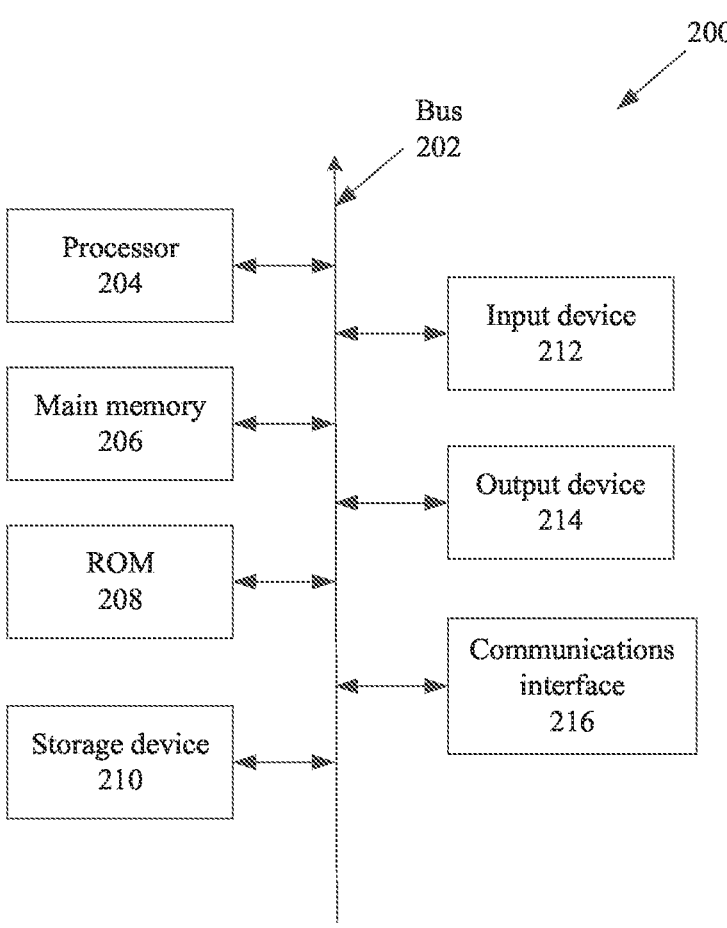
FIG. 2 is a block diagram illustrating an exemplary internal structure of a computer that can be used to implement one or more of the features of the present invention.

A server refers to a dedicated computer (e.g. with an exemplary internal structure as shown in FIG. 2) that is adapted to handle significant volumes of data processing and exchange between internal components of the computer as well as with other devices or clients (e.g. 114, 120) or systems (e.g. 106) over a communications network 104, 116, 122. A server also refers to a plurality of dedicated computers (as described above) that are adapted to communicate with each other and work together as a single apparatus. A server includes suitable operating system software (e.g. Microsoft™ Windows Server™, Ubuntu™, Red Hat™ Enterprise Linux™, or the like) to handle network communications as well as data communications and coordination between internal components of the server.

A client (e.g. 114, 120) refers to any electronic device that can communicate with a server over a communications network 116/122. For example, a client may include a conventional personal computer (e.g. with an exemplary internal structure as shown in FIG. 2), mobile phone, personal digital assistant, tablet computing device, or a similar or equivalent device. The client includes suitable operating system software (e.g. Microsoft™ Windows™, MacOS™, iOS™, Android™, or the like) to handle network communications as well as data communications and coordination between internal components of the client.

According to one representative embodiment of the invention, the retail management system 102 consists of an automated retail store management system 108 configured to communicate with and control one or more automated retail store systems 106₁ to 106ₙ.

According to another representative embodiment of the invention, the retail management system 102 includes at least one automated retail store management system 108, each configured to communicate with and control a different group of one or more different automated retail store systems 106₁ to 106ₙ. Preferably, the above automated retail store management system 108 is configured to communicate with and control one or both of an IMAX 110 and OIX 112. Preferably, the above automated retail store management system 108 is configured to communicate with one or more courier client devices 114 via a communications network 116.

According to another representative embodiment of the invention, the retail management system 102 (as described above) further includes an online shopping platform 118 that communicates with one or more customer client devices 120 over a communications network 122. Preferably, the online shopping platform 118 is also configured to communicate with a user management system 124 and an electronic payment system 126.

FIG. 2 is a block diagram illustrating an exemplary internal structure of a computer 200, which includes a bus 202, a processor 204, a main memory 206, a read-only memory (ROM) 208, a storage device 210, one or more input devices 212, one or more output devices 214, a communications interface 216. The bus 202 includes one or more conductors for the components of the computer to communicate (e.g. send or exchange data) with each other.

The processor 204 may include one or more conventional microprocessors, microcontrollers, or similar or equivalent data/signal processing components (e.g. an Application Specific Integrated Circuit (ASIC) or Field-Programmable Gate Array (FPGA)) configured to interpret and execute instructions (including in the form of code or signals) provided to the processor 204. The main memory 206 may include a conventional random access memory (RAM) device or another type of volatile data storage device that can store information and instructions for execution by the processor 204. The ROM 208 may include a conventional read-only memory device or another type of non-volatile data storage device that can store information and instructions for execution by the processor 204. The storage device 210 includes any persistent electronic data storage device (e.g. a hard drive), which may comprise of a magnetic, optical or circuit-based data recording medium and any related circuitry and physical components for reading and writing data to/from the recording medium.

The input device 212 may include one or more conventional mechanisms or sensors for a user to input information to, or control the operation of, the processor 204 (e.g. a mouse, keyboard, camera, microphone, etc.). The output device 214 may include one or more conventional mechanisms or sensors for the processor 204 to present information to the user (e.g. a display, printer, speaker, etc.). The communications interface 216 may include any means of data communication from the processor 204 to another device (e.g. a wired or wireless network adaptor card, and/or one or more controllers for controlling different external electromechanical subsystems of the automated retail store system 106 based on sensor input data received from one or more input sensors associated with each subsystem).

Figure 3:
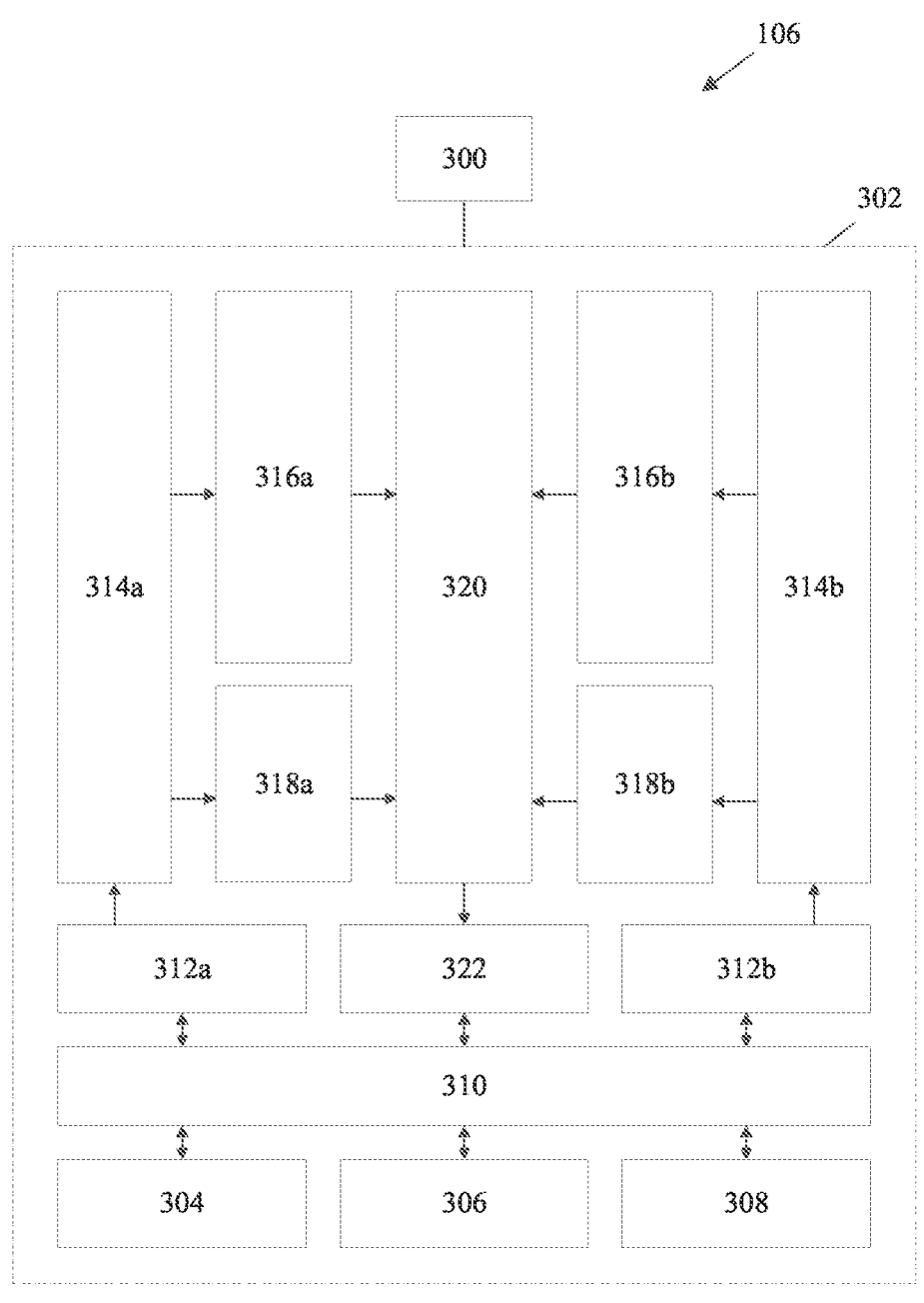
FIG. 3 is a block diagram illustrating an exemplary internal structure of an automated retail store system according to a representative embodiment of the invention.

Systems/platforms 108, 110, 112, 118, 124, 126 in FIG. 1 and system 300 in FIG. 3 have their own respective database for storing and retrieving information related the data processing performed by each system. A database refers to any means of storing and accessing a structured data set, including for example, one or more of the following: a relational database, a distributed database, an object-oriented database, and one or more structured data files (e.g. a Comma Separated Value (CSV) file, Extensible Markup Language (XML) file, JavaScript Object Notation (JSON) format file). The database may be provided either on the server (e.g. as part of the information stored in the storage device 210), or on a separate computing device that the server controls according to a known or predetermined Application Programming Interface (API) or communications protocol.

FIG. 3 shows the exemplary internal structure of an automated retail store system 106 according to a representative embodiment of the invention. Each automated retail store system 106 includes a store control system 300 and controller 302. The store control system 300 serves as a local controller for each automated retail store system 106.

According to one representative embodiment of the invention, the store control system 300 is implemented on a computer 200 with an exemplary internal structure as shown in FIG. 2, which includes a communications interface 216 configured to communicate with the controller 302. The controller 302 includes one or more programmable logic controllers (PLC). There are one or more PLCs controlling the actuating components and/or sensors of each electromechanical subsystem (e.g. 304, 306, 308, 310, 312*a*, 312*b*, 314*a*, 314*b*, 320 and 322) of the automated retail store system 106. Each PLC is pre-configured to control one or more of the actuating components (e.g. motors, robotic arms, etc) and/or sensors of an electromechanical subsystem (e.g. 304, 306, 308, 310, 312*a*, 312*b*, 314*a*, 314*b*, 320 and 322) to perform one or more specific operations that result in the electromechanical subsystem performing a particular action—for example, control a positioning apparatus (which may include a robotic arm) to move to a certain position in three-dimensional space, control a retrieval apparatus to perform a retrieval action, control a retrieval apparatus to perform a release action, etc. The specific operations performed by the actuating components under the control of a PLC may be based on (or in response to) sensor input data received from one or more sensors of a particular electromechanical subsystem. For example, a positioning apparatus may be controlled to move an attached retrieval apparatus to a certain position in three-dimensional space, where fine adjustment of the position of the retrieval apparatus may be controlled based on the analysis of sensor input data representing an image captured from a camera sensor proximate to the retrieval mechanism. For example, the analysis of such sensor input data representing an image may be used to determine the retrieval apparatus's distance from (or position relative to) a target location in three-dimensional space, which is used to control the positioning apparatus and/or retrieval apparatus to make small or incremental adjustments to their respective positions in three-dimensional space to move the retrieval apparatus closer to the target location.

The store control system 300 serves as a communications bridge that allows the automated retail store management system 108 to control and monitor one or more operations or procedures performed by the electromechanical subsystems (e.g. 304, 306, 308, 310, 312*a*, 312*b*, 314*a*, 314*b*, 320 and 322) of the automated retail store system 106. For example, according to one representative embodiment of the invention, the automated retail store management system 108 may send one or more control messages to the store control system 300 of an automated retail store system 106, where a control message includes information representing one or more executable jobs to be performed by the automated retail store system 106. For each executable job in a control message, the processor 204 of the store control system 300 may generate a sequence of one or more low level instructions, each low level instruction corresponding to a specific pre-configured action to be performed by an electromechanical subsystem (e.g. 304, 306, 308, 310, 312*a*, 312*b*, 314*a*, 314*b*, 320 and 322) of the automated retail store system 106 under the control of one or more PLCs. The processor 204 of the store control system 300 then controls the one or more PLCs to perform pre-configured actions based on the sequence of low level instructions generated by the store control system 300. The PLCs coordinate all the electromechanical devices of each subsystem (e.g. 306, 308, 310, 312*a*, 312*b*, 314*a*, 314*b*, 320 and 322) to perform the executable jobs and in a manner that ensures the mechanical parts and electromechanical operations performed by the subsystems do not interfere (e.g. obstruct or engage) with each other when performing the executable jobs.

The automated retail store management system 108 may also receive response data and/or signals representing one or more response messages from the store control system 300. A response message for example may include information representing status information associated with an executable job, and/or other signals or information representing an operation state of any component or system of the automated retail store system 106—for example, to provide feedback to the store control system 300 on the execution status of an executable job, generate signals representing a operational status or mechanical condition of different electromechanical components of each subsystem (e.g. 304, 306, 308, 310, 312*a*, 312*b*, 314*a*, 314*b*, 320 and 322).

According to a representative embodiment of the invention, the store control system 300 of an automated retail store system 106 is configured to receive order information for an order by a customer for items in that store 106. For example, the input device 212 and output device 214 of the store control system 300 may be configured to provide a user interface module through which a customer can access the online shopping platform 118 to browse items and promotions and order one or more such items. The user interface allows customers to order items directly from an automated retail store system 106 instead of using a client device 120. When a customer places an order by providing user input using the user interface module of the automated retail store system 106, the processor 204 of the store control system 300 generates order information that is submitted to the online shopping platform 118. Order information submitted by the store control system 300 is the same as that for orders submitted using a client device 120.

As shown in FIG. 3, an automated retail store system 106 includes a storage rack 304, one or more customer locker compartments 306, one or more courier locker compartments 308, a conveyor system 310, a sorting system 312*a*/312*b*, a restocking system 314*a*/314*b*, a first storage shelf 316*a*/316*b*, a second storage shelf 318*a*/318*b*, a retrieval system 320 and a handover area 322. The arrows in FIG. 3 show the direction of movement of items and containers between the various components and subsystems of the automated retail store system 106.

Figure 4:
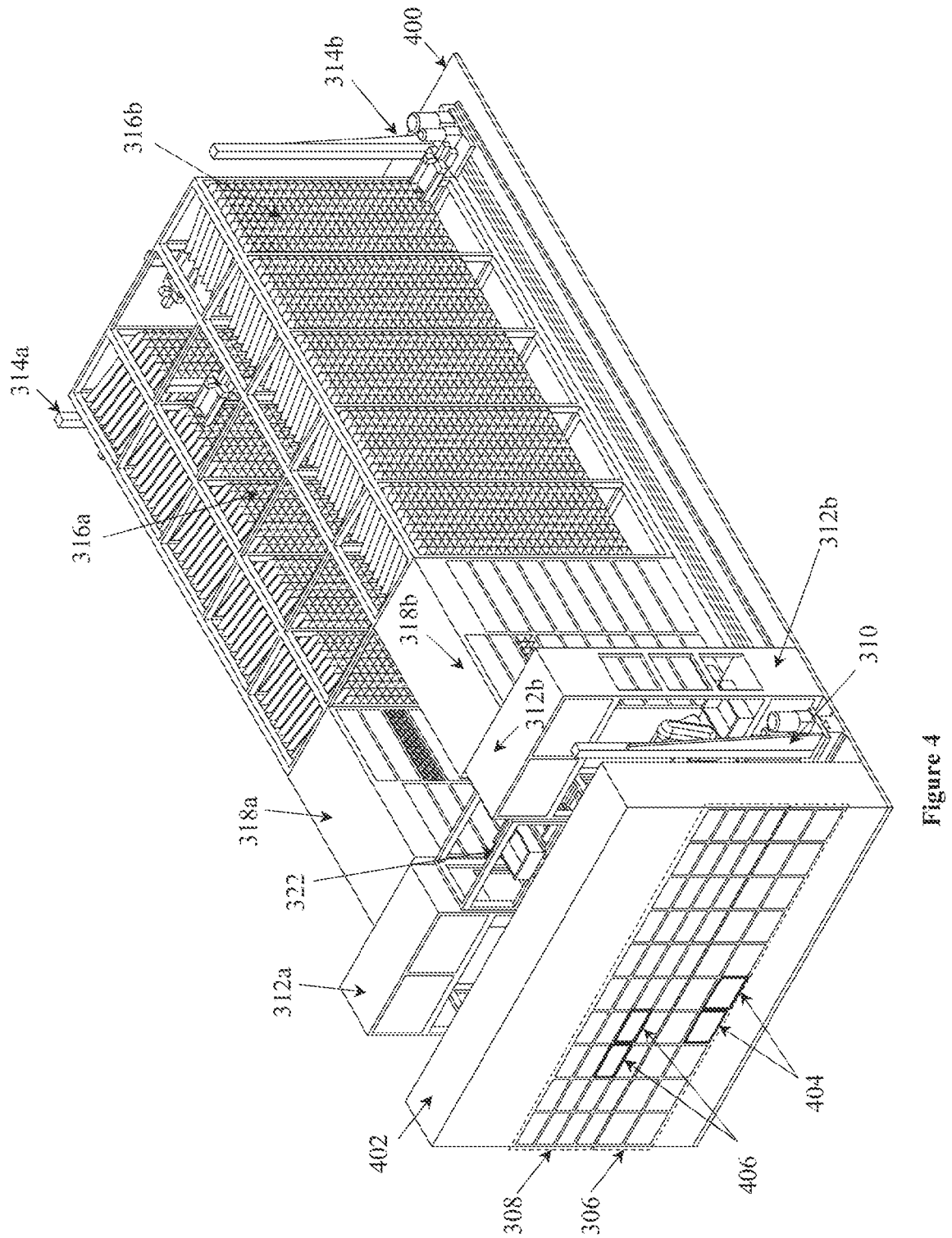
FIG. 4 is a right perspective view of the exemplary main internal components and of an automated retail store system according to a representative embodiment of the invention.
Figure 5:
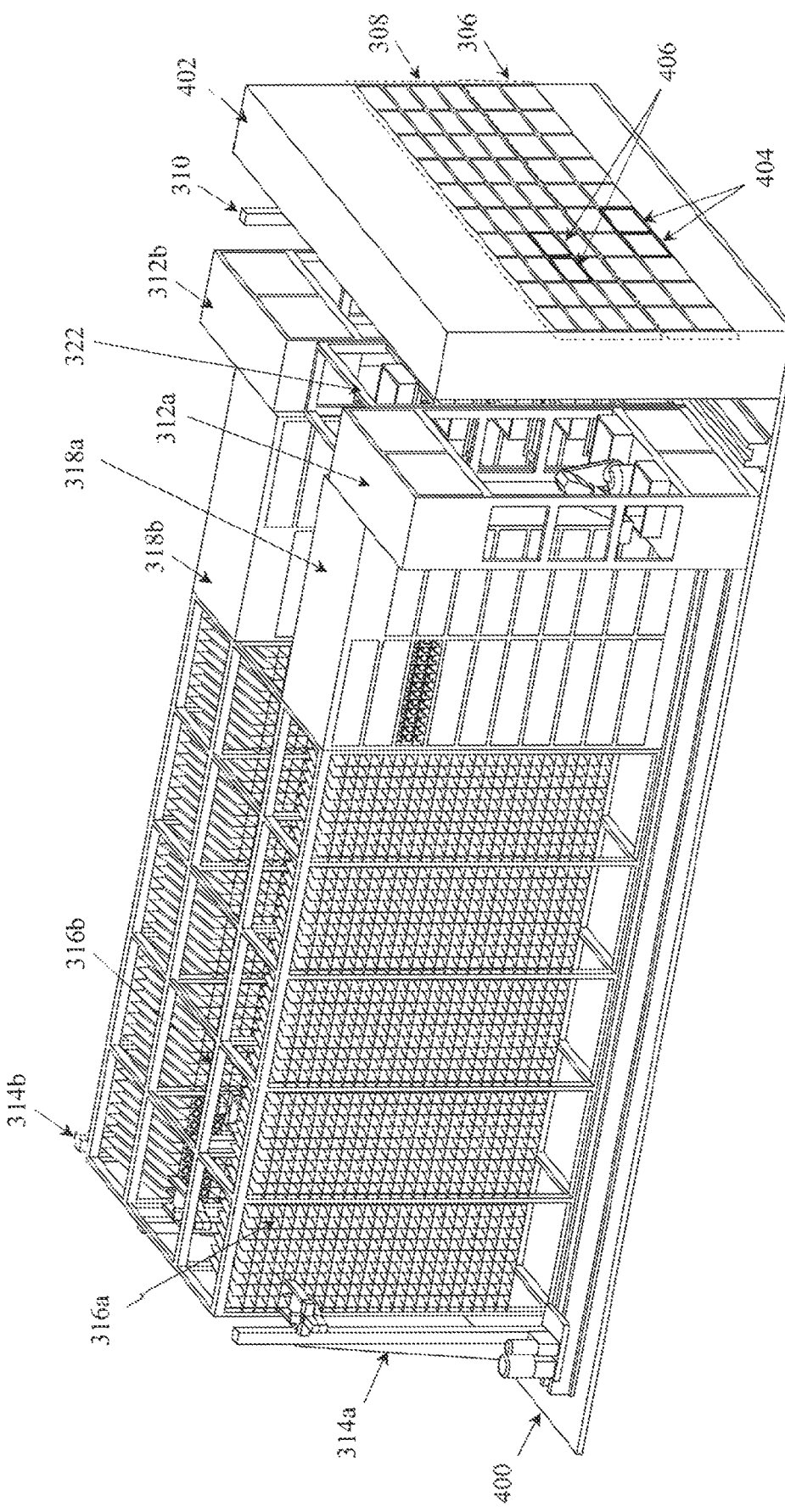
FIG. 5 is a left perspective view of the automated retail store system in FIG. 4.
Figure 6:
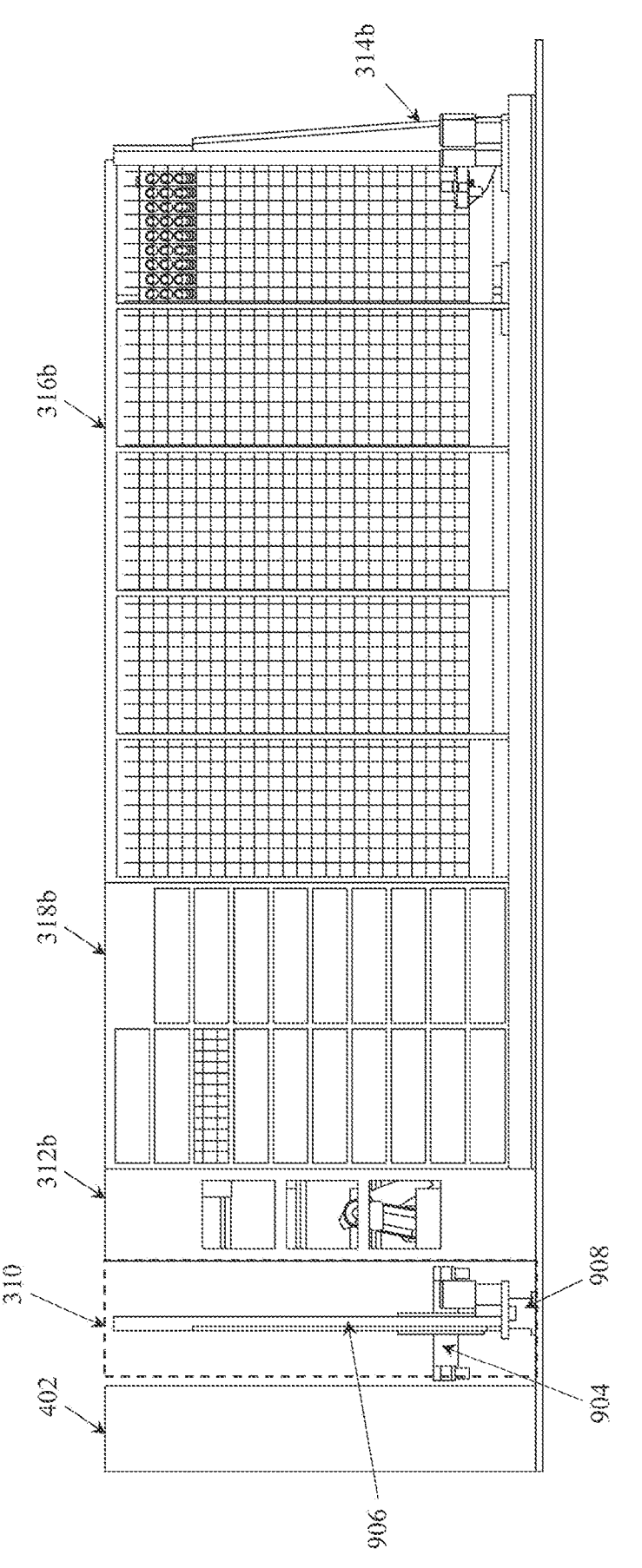
FIG. 6 is a right side view of the automated retail store system in FIG. 4.
Figure 7:
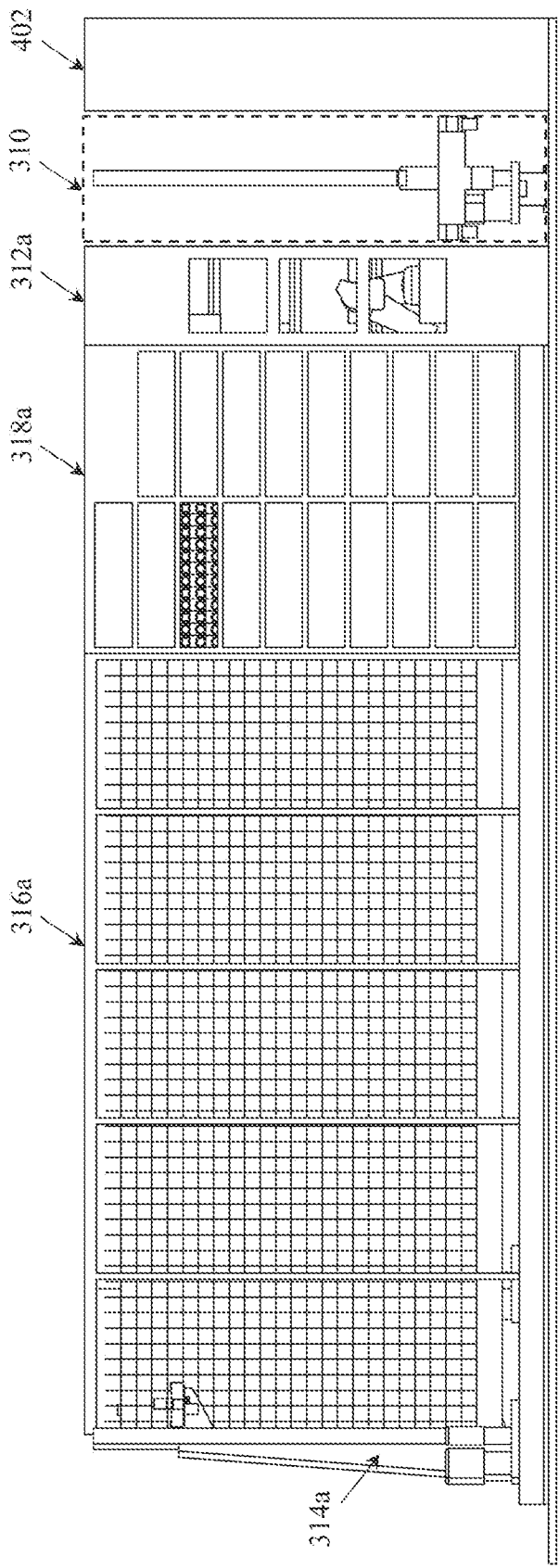
FIG. 7 is a left side view of the automated retail store system in FIG. 4.
Figure 8:
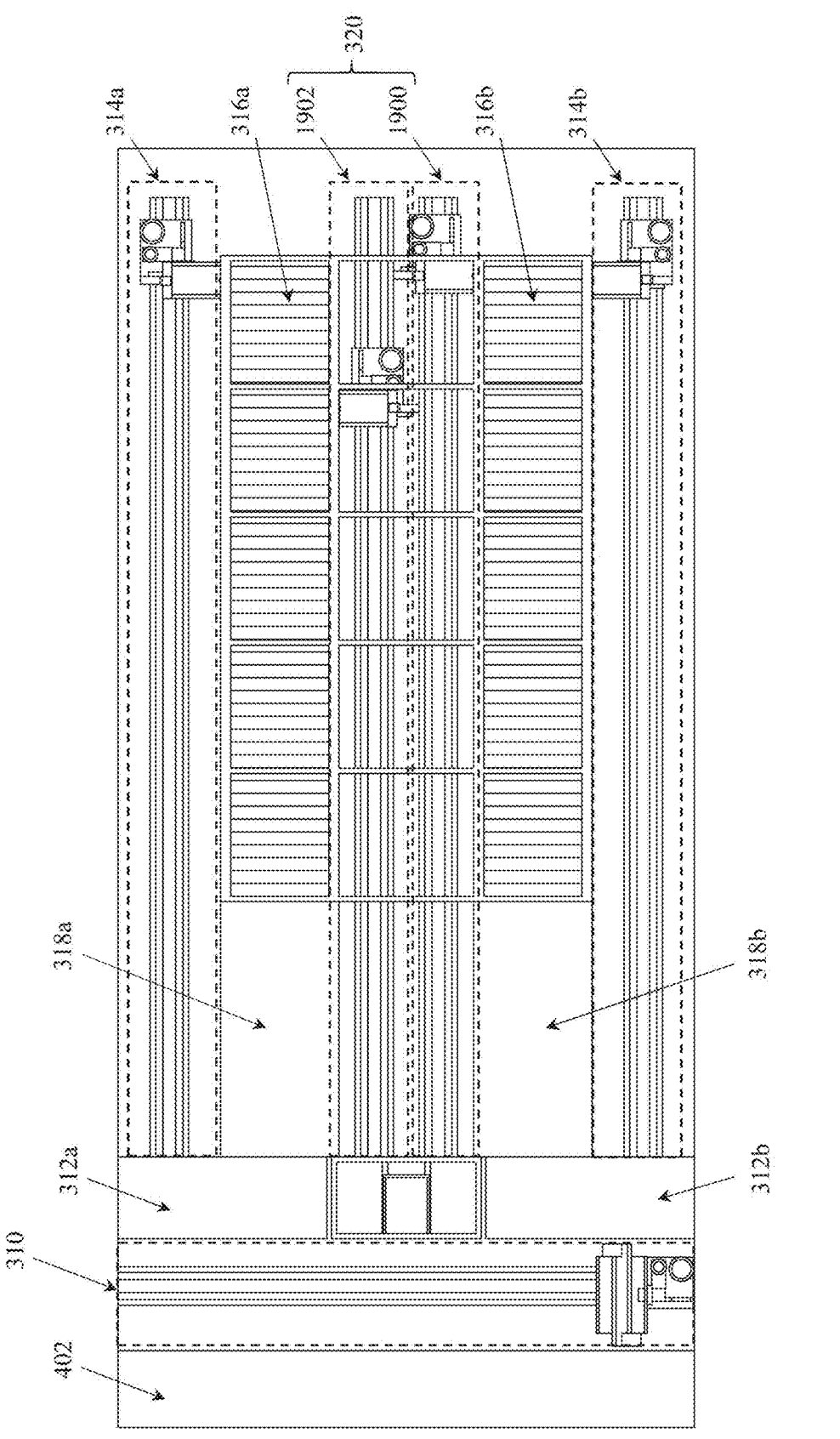
FIG. 8 is a top view of the automated retail store system in FIG. 4.

The basic operation of an automated retail store system 106 according to one representative embodiment of the invention is described below with reference to FIGS. 4 to 20. FIG. 4 is a right perspective view of the main internal components and electromechanical subsystems of an automated retail store system 106 according to one representative embodiment of the invention. FIG. 5 is a left perspective view of the automated retail store system 106 shown in FIG. 4. FIG. 6 is a right side view of the automated retail store system 106 shown in FIG. 4. FIG. 7 is a left side view of the automated retail store system 106 shown in FIG. 4. FIG. 8 is a top view of the automated retail store system 106 shown in FIG. 4.

In the example shown in FIG. 4, the main internal components and electromechanical subsystems of an automated retail store system 106 are configured to fit within the useable internal space of a retail site. In the example shown in FIG. 4, the base 400 of the automated retail store system 106 may be substantially rectangular in shape which makes it ideally suited for use in a retail site that is substantially rectangular in shape. The height of the automated retail store system 106 (and in particular the height of the storage shelves) are configured to be as high as possible, and preferably the height is defined by the height of the useable internal space of the retail site. In this way, the internal components and electromechanical subsystems of the automated retail store system 106 are configured to make the most efficient and effective use of the internal space of a retail site. It should be emphasised that the internal components and electromechanical subsystems of an automated retail store system 106 can be configured to fit within the internal space of any retail site of any shape or configuration, and is not limited to the exemplary configuration shown in FIG. 4.

The automated retail store system 106 includes a shop front portion 402 which is the main area where customers interact with the automated retail store system 106. In the example shown in FIG. 4, the shop front portion 402 includes a plurality of customer locker compartments 306 and a plurality of courier locker compartments 308. The shop front portion 402 may also be adapted to provide a storage rack 304a/304b (together referred to as 304) (see FIG. 11) with a plurality of storage compartments 1100a/1100b (together referred to as 1100).

Figure 9:
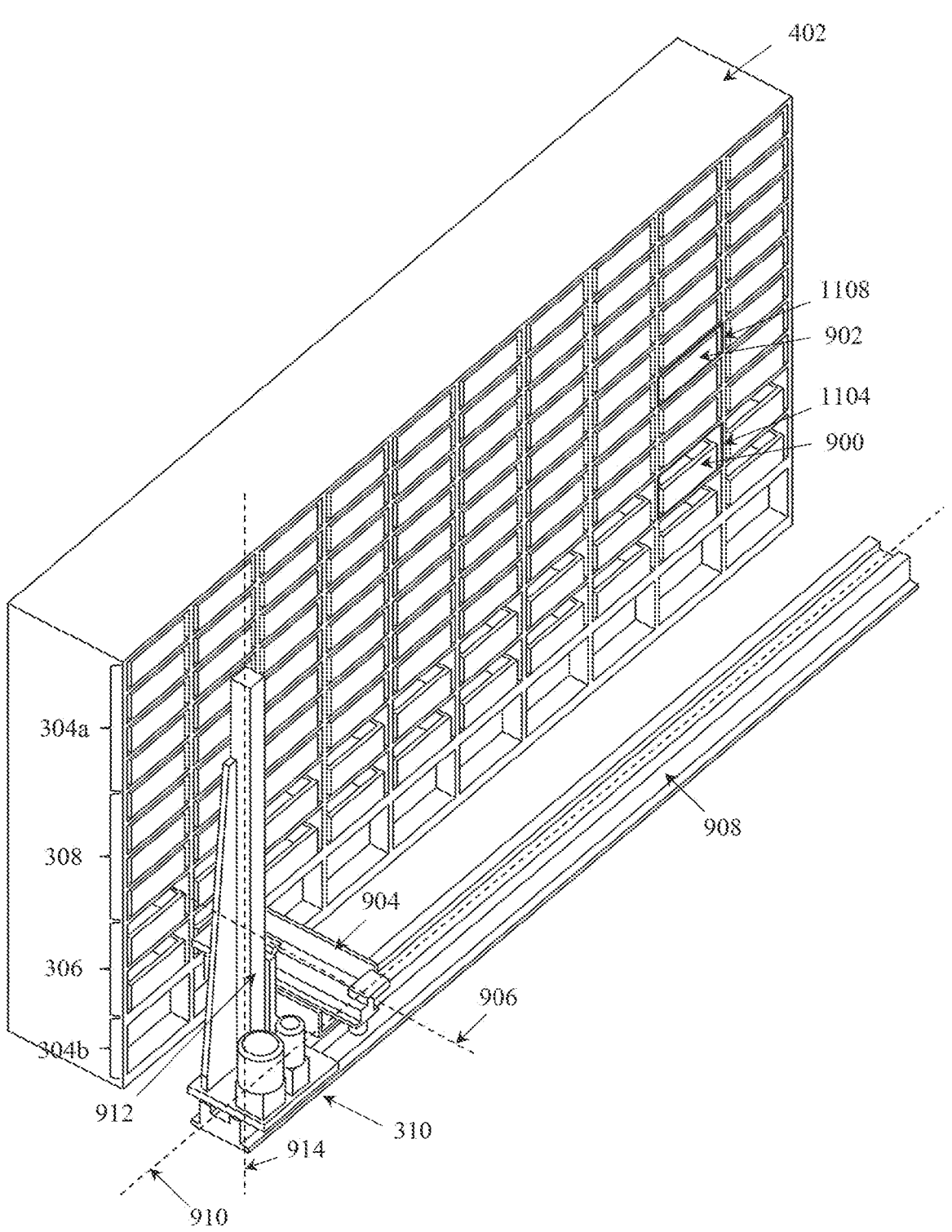
FIG. 9 is a rear perspective view of the shop front portion and conveyor system of an automated retail store system according to a representative embodiment of the invention.
Figure 10:
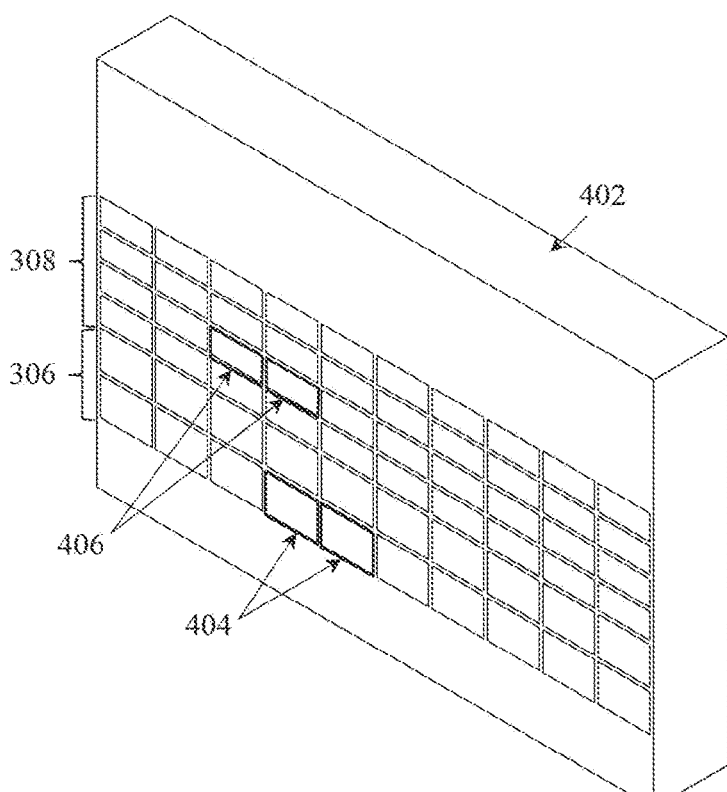
FIG. 10 is a front perspective view of the shop front portion of an automated retail store system according to a representative embodiment of the invention.
Figure 11:
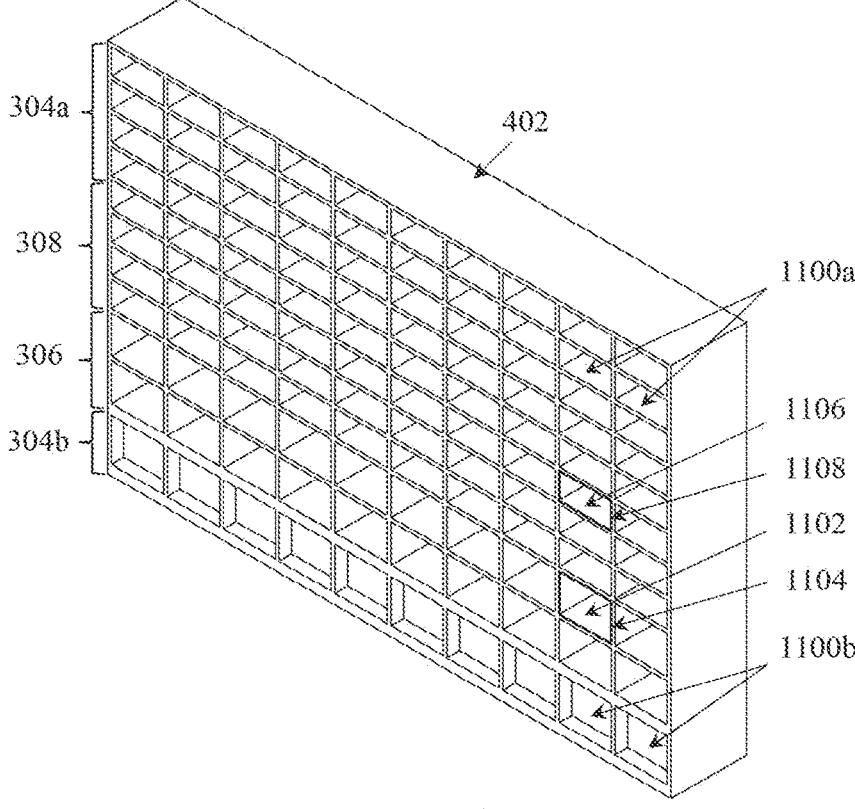
FIG. 11 is a rear perspective view of the shop front portion of an automated retail store system according to a representative embodiment of the invention.

FIG. 9 is a rear perspective view of the shop front portion 402 with a conveyor system 310. FIG. 10 is a front perspective view of the shop front portion 402 showing the customer facing portion of the customer locker compartments 306 and courier locker compartments 308. FIG. 11 is a rear perspective view of the shop front portion 402 showing the shop (or machine) facing portion of the customer locker compartments 306, courier locker compartments 308 and storage rack 304.

As shown in FIGS. 4, 9, 10 and 11, each customer locker compartment 306 includes: (i) a storage cavity 1102 for receiving a delivery container 900 (e.g. filled with items ordered by the customer) from the conveyor system 310; (ii) a front opening 404 through which a customer can access the storage cavity 1102 of the customer locker compartment 306 (e.g. to retrieve the items in the delivery container 900 stored therein); and (iii) a rear opening 1104 through which the conveyor system 310 delivers or retrieves a delivery container 900 to or from the customer locker compartment 306. Preferably, the front opening 404 of each customer locker compartment 306 includes an access barrier for controlling access to the storage cavity 1102 of the customer locker compartment 306. For example, the access barrier may be in the form of a transparent door that can be configured in an open position to allow a customer to access the storage cavity 1102 of the customer locker compartment 306, or configured in a closed position to prevent or resist human access to the storage cavity 1102 of the customer locker compartment 306. The access barrier may include a lock component that controls the access state of the access barrier. For example, the lock component is preferably configured to maintain the access barrier in a closed position until access permission to the specific customer locker compartment 306 is granted by the automated retail store system 106 or automated retail store management system 108. For example, where a particular customer locker compartment 306 contains a delivery container with items ordered by a particular customer, access permission may be granted after an identity of the customer placing that order has been verified (e.g. by the automated retail store system 106 or automated retail store management system 108 communicating with user management system 124).

As shown in FIGS. 4, 9, 10 and 11, each courier locker compartment 308 (may be referred as a restock locker when the compartment is for restocking) includes: (i) a storage cavity 1106 for receiving a courier container 902 from the conveyor system 310 (e.g. filled with items for restocking the automated retail store system 106, or for retrieving rejected or expired items from the automated retail store system 106); (ii) a front opening 406 through which a courier can access the storage cavity 1106 of the courier locker compartment 308 (e.g. to retrieve the items in the courier container 902 stored therein); and (iii) a rear opening 1108 through which the conveyor system delivers or retrieves a courier container 902 to or from the courier locker compartment 308. Preferably, the front opening 406 of each courier locker compartment 308 includes an access barrier for controlling access to the storage cavity 1106 of the courier locker compartment 308. For example, the access barrier may be in the form of a door that can be configured in an open position to allow a courier to access the storage cavity 1106 of the courier locker compartment 308, or configured in a closed position to prevent or resist human access to the storage cavity 1106 of the courier locker compartment 308. The access barrier may include a lock component that controls the access state of the access barrier. For example, the lock component is preferably configured to maintain the access barrier in a closed position until access permission to the specific courier locker compartment 308 is granted by the automated retail store system 106 or automated retail store management system 108. For example, access permission may be granted after an identity of the courier has been verified (e.g. by the automated retail store system 106 or automated retail store management system 108 communicating with the user management system 124).

In a representative embodiment of the invention, the size (e.g. external physical dimensions) of a delivery container 900 may be different than the size (e.g. external physical dimensions) of a courier container 902. The size (e.g. internal physical dimensions) of the storage cavity 1102 may be specifically adapted for only receiving a delivery container 900, and the size of the storage cavity 1106 may be specifically adapted for only receiving a courier container 902. Preferably, a user interface of the store control system 300 (not shown in FIG. 4) is accessible from the shop front portion 402.

Preferably, the storage compartments 1100 of the storage rack 304 are only accessible by the conveyor system 310. Each storage compartment of the storage rack 304 includes a storage cavity for receiving a delivery container 900 or courier container 902 from the conveyor system 310. According to a representative embodiment of the invention, where the size of a delivery container 900 is different than the size of a courier container 902, the storage compartments 1100 may include storage compartments of different size (e.g. internal physical dimensions). For example, the size of some storage compartments 1100b may be specifically adapted for only receiving a delivery container 900, and the size of other storage compartments 1100a may be specifically adapted for only receiving a courier container 902.

As shown in FIG. 9, according to one representative embodiment of the invention, the conveyor system 310 includes a retrieval apparatus including a retrieval arm 904 that can be configured (under the control of the store control system 300 and/or one or more PLCs) for delivering or retrieving a delivery container 900 to or from a customer locker compartment 306, or delivering or retrieving a courier container 902 to or from a courier locker compartment 308, or delivering or retrieving a delivery container 900 or courier container 902 from the handover area 322, or delivering or retrieving a courier container 902 from the sorting system 312a, 312b, or delivering or retrieving a delivery container 900 or courier container 902 from storage rack 304. The retrieval arm 904 can be controlled to move along to a first longitudinal axis 906 in three-dimensional space.

The conveyor system 310 also includes a positioning apparatus including a first actuator, second actuator, linear path 908 and linear arm 912. The first actuator (which includes one or more electronically controlled servo motors) that can be configured (under the control of one or more PLCs) for moving the retrieval arm 904 (e.g. along a linear path 908) to a target position along to a second longitudinal axis 910 in three-dimensional space. The conveyor system 310 also includes a second actuator (which includes one or more electronically controlled servo motors) that can be configured (under the control of one or more PLCs) for moving the retrieval arm 904 (e.g. along a linear arm 912) to a target position along a third longitudinal axis 914 in three-dimensional space. Preferably, the linear arm 912 (and third longitudinal axis 914) is substantially perpendicular to the linear path 908 (and second longitudinal axis 910). By controlling the position of the linear arm 912 along the linear path 908, the third longitudinal axis 914 can move to another (e.g. horizontally) parallel position along the second longitudinal axis 910. By controlling the position of the retrieval arm 904 along the linear arm 912, the second longitudinal axis 910 can move to another (e.g. vertically) parallel position along the third longitudinal axis 914. The position of the retrieval arm 904 (and first longitudinal axis 906) is determined based on the position of the linear arm 912 along the linear path 908 (and thus based on the second and third longitudinal axes 910/914).

The conveyor system 310 can be configured (under the control of the store control system 300 and/or one or more PLCs) so that positioning apparatus moves the retrieval apparatus to a target retrieval location (or position) proximate to a container (e.g. in the storage rack 304, customer locker compartment 306, courier locker compartment 308, sorting system 312a/312b and/or handover area 322). When positioned at the target retrieval position, the retrieval apparatus retrieves a container at the target retrieval location. The positioning apparatus then moves the retrieval apparatus to a drop-off location (or position) in three-dimensional space (e.g. in the storage rack 304, customer locker compartment 306, courier locker compartment 308, sorting system 312a/312b and/or handover area 322). The retrieval apparatus releases the retrieved container when positioned at the drop-off location.

Figure 12:
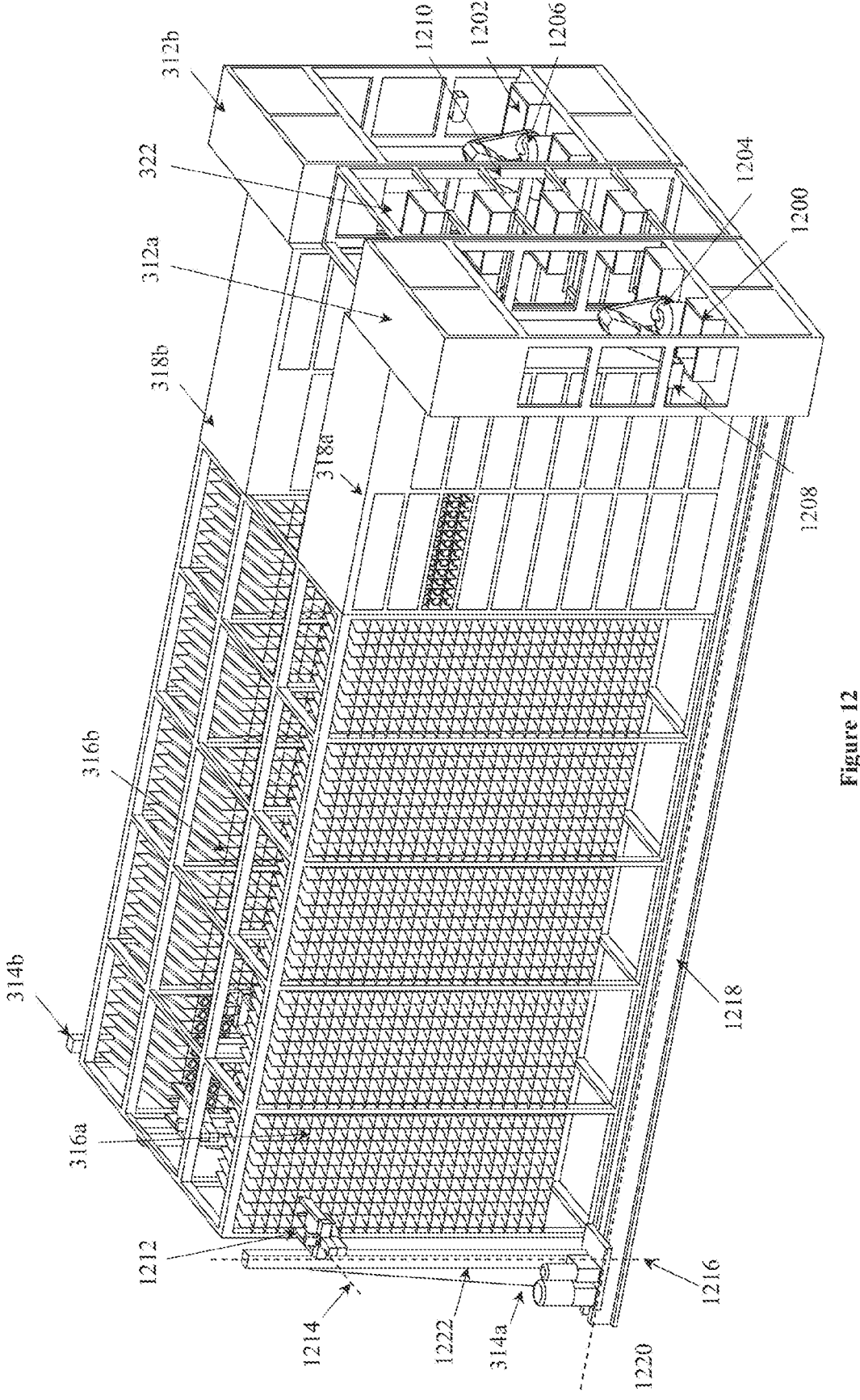
FIG. 12 is a front left perspective view of the sorting system, restocking system, storage shelves and handover area of an automated retail store system according to a representative embodiment of the invention.

FIG. 12 is a left perspective view of internal components and electromechanical subsystems of an automated retail store system 106, and in particular, shows the sorting system 312a/312b, restocking system 314a/314b, first storage shelves 316a/316b, second storage shelves 318a/318b and handover area 322 according to a representative embodiment of the invention.

In the exemplary embodiment shown in FIG. 12, the sorting system 312 comprises of a first sorting system 312a and a second sorting system 312b. The first sorting system 312a is configured to prepare items received by the automated retail store system 106 for storage in a first aisle of storage shelves (comprising of a first storage shelf 316a and second storage shelf 318a). The second sorting system 312b is configured to prepare items received by the automated retail store system 106 for storage in a second aisle of storage shelves (comprising of a first storage shelf 316b and second storage shelf 318b).

Both the first and second sorting systems 312a/312b operate (under the control of one or more PLCs) in a similar way as described below. Each sorting system 312a/312b includes a receiving area 1200/1202 for receiving from the conveyor system 310 a courier container 902 containing one or more items to be stored or restocked in the automated retail store system 106. The courier container containing items for loading or restocking the automated retail store system 106 may also be referred to as a restocking container. The courier arrives at the automated retail store system 106 with one or more restocking containers. The courier then uses a courier client device 114 (e.g. using a courier application installed on the courier client device 114) to carry out verification of an identity of the courier. The courier may also indicate (using the courier application) that the courier is executing a restocking delivery. After the automated retail store management system 108 has successfully verified an identity of the courier (e.g. by communicating with the user management system), the automated retail store management system 108 sends a control message to the store control system 300 of the automated retail store system 106, which contains an executable job directing the lock component of an available courier locker compartment 308 to allow the courier access to that courier locker compartment 308. The courier removes any existing (e.g. empty) courier containers in the courier locker compartment 308, loads the restocking container into the same courier locker compartment 308 and sets the access barrier to the courier locker compartment 308 to a closed position. When the store control system 300 detects that a restocking container has been loaded into a courier locker compartment 308 and its access barrier is in a closed position, the store control system 300 controls the conveyor system 310 (operating under the control of one or more PLCs) to retrieve the restocking container from the relevant courier locker compartment 308, and place it in a receiving area 1200/1202 of the sorting system 312a/312b.

The store control system 300 may then be directed (e.g. based on control messages) to control an item preparation system 1204/1206 of the sorting system 312a/312b to retrieve each item from the courier container in the receiving area 1200/1202. For example, the item preparation system 1204/1206 may include a mechanical retrieval mechanism (e.g. a robotic arm) that retrieves each item from the courier container one by one for processing. The item preparation system 1204/1206 includes a sensor (e.g. barcode, QR code or RFID tag reader) for obtaining a unique item identifier (e.g. based on an item specific barcode, QR code or RFID tag) from or for that item. Based on the unique item identifier obtained, the item preparation system 1204/1206 determines (e.g. with the store control system 300 and/or automated retail store management system 108) which storage channel in the storage shelves 316a/316b/318a/318b the item should be stored in. The identity of this storage channel determines a target position (e.g. corresponding a storage channel) for the restocking system 314a/314b. The item is then placed in a retrieval area 1208/1210 for the restocking system 314a/314b to pickup and deliver to the identified storage channel or target position.

Figure 15:
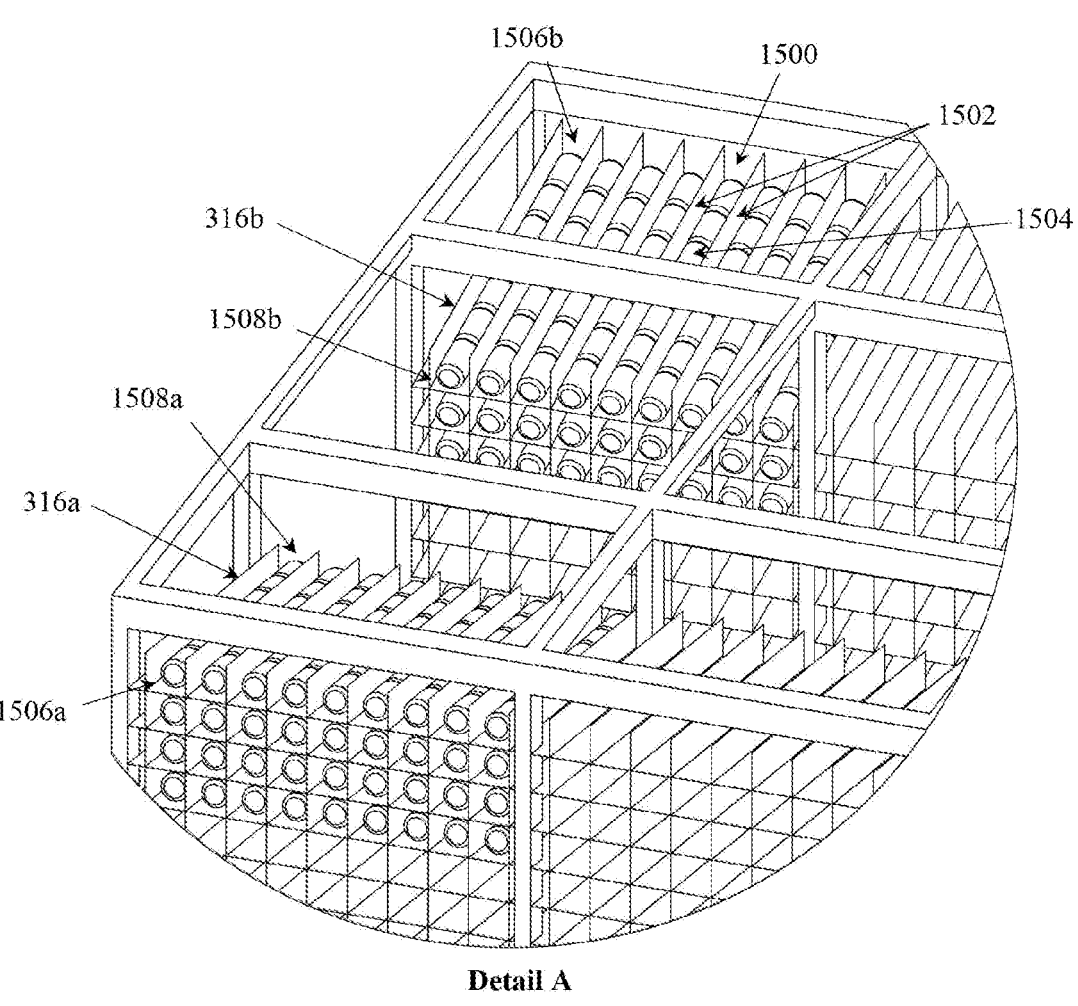
FIG. 15 is a front left perspective view of the first storage shelves according to a representative embodiment of the invention.
Figure 15:
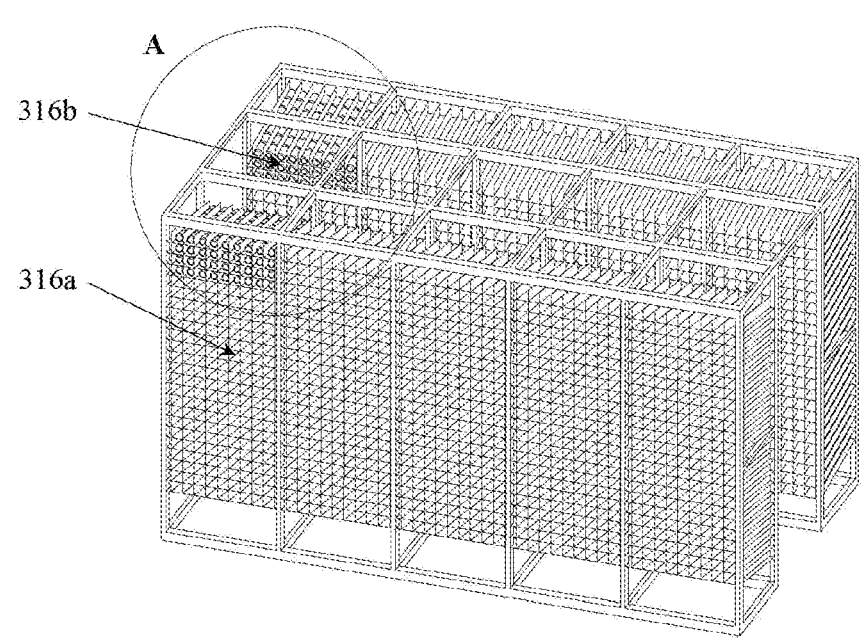

In the context of the present invention, a sensor can refer to any means for obtaining information from or for an item (e.g. a barcode reader, QR code reader or RFID tag reader), or any means for determining (e.g. by measurement or detection) a physical attribute (e.g. a distance, orientation, or presence of any proximate objects, etc.), physical condition or physical state of an object. A sensor may include one or more of an optical sensor, camera sensor, laser sensor, infrared sensor, ultrasonic sensor, magnetic sensor or mechanical sensor. One or more of the sensors may be adapted for obtaining information representing or determining one or more of the following parameters:

P1) a count of a number of said items currently in a storage channel 1500 (see FIG. 15/16);

P2) a count of a number of said items added to a storage channel 1500;

P3) a count of a number of said items retrieved from a storage channel 1500;

P4) a time at which a particular said item is added to a storage channel 1500;

P5) a time at which a particular said item is retrieved from a storage channel 1500;

P6) an expiry date for a particular item added to a storage channel 1500; and P7) a visual representation of a physical condition of any of the items in a container (e.g. whether the item is damaged or has some other a potential physical defect).

The item preparation system 1204/1206 may be adapted to configure each item into a desired an orientation (which may be different for each item). This enables each item to be reliably retrieved by the restocking system 314a/314b, and/or placed into a storage channel in a way that maximises use of storage space or minimises potential damage to the item during delivery to, storage in, or retrieval from a storage channel. According to a representative embodiment of the invention, a robotic arm is provided to manipulate the three-dimensional orientation of each item in the retrieval area 1208/1210.

As shown in FIG. 12, according to one representative embodiment of the invention, the restocking system 314a includes a retrieval apparatus including a retrieval arm 1212 that can be configured (under the control of the store control system and/or one or more PLCs) for retrieving an item from the retrieval area 1208 of the sorting system 312a, and delivering the item to an identified storage channel (or target location) in the storage shelves 316a/318a. The retrieval arm 1212 can be controlled to move along a first longitudinal axis 1214 in three-dimensional space. Preferably, the first longitudinal axis 1214 is substantially perpendicular to a second longitudinal axis 1216 in three-dimensional space, and the first longitudinal axis 1214 can be configured to rotate to any position around the second longitudinal axis 1216.

The restocking system 314a also includes a positioning apparatus including a first actuator, second actuator, linear path 1218 and linear arm 1222. The first actuator (which includes one or more electronically controlled servo motors) that can be configured (under the control of one or more PLCs) for moving the retrieval arm 1212 (e.g. along a linear path 1218) to a target position along a third longitudinal axis 1220 in three-dimensional space. The restocking system 314a also includes a second actuator (which includes one or more electronically controlled servo motors) that can be configured (under the control of one or more PLCs) for moving the retrieval arm 1212 (e.g. along a linear arm 1222) to a target position along the second longitudinal axis 1216. Preferably, the linear arm 1222 (and second longitudinal axis 1216) is substantially perpendicular to the linear path 1218 (and third longitudinal axis 1220). By controlling the position of the linear arm 1222 along the linear path 1218, the second longitudinal axis 1216 can move to another (e.g. horizontally) parallel position along the third longitudinal axis 1220. By controlling the position of the retrieval arm

1212 along the linear arm 1222, the third longitudinal axis 1220 can move to another (e.g. vertically) parallel position along the second longitudinal axis 1216. The position of the retrieval arm 1212 (and first longitudinal axis 1214) is determined based on the position of the linear arm 1222 along the linear path 1218 (and thus based on the second and third longitudinal axes 1216/1220).

Figure 14:
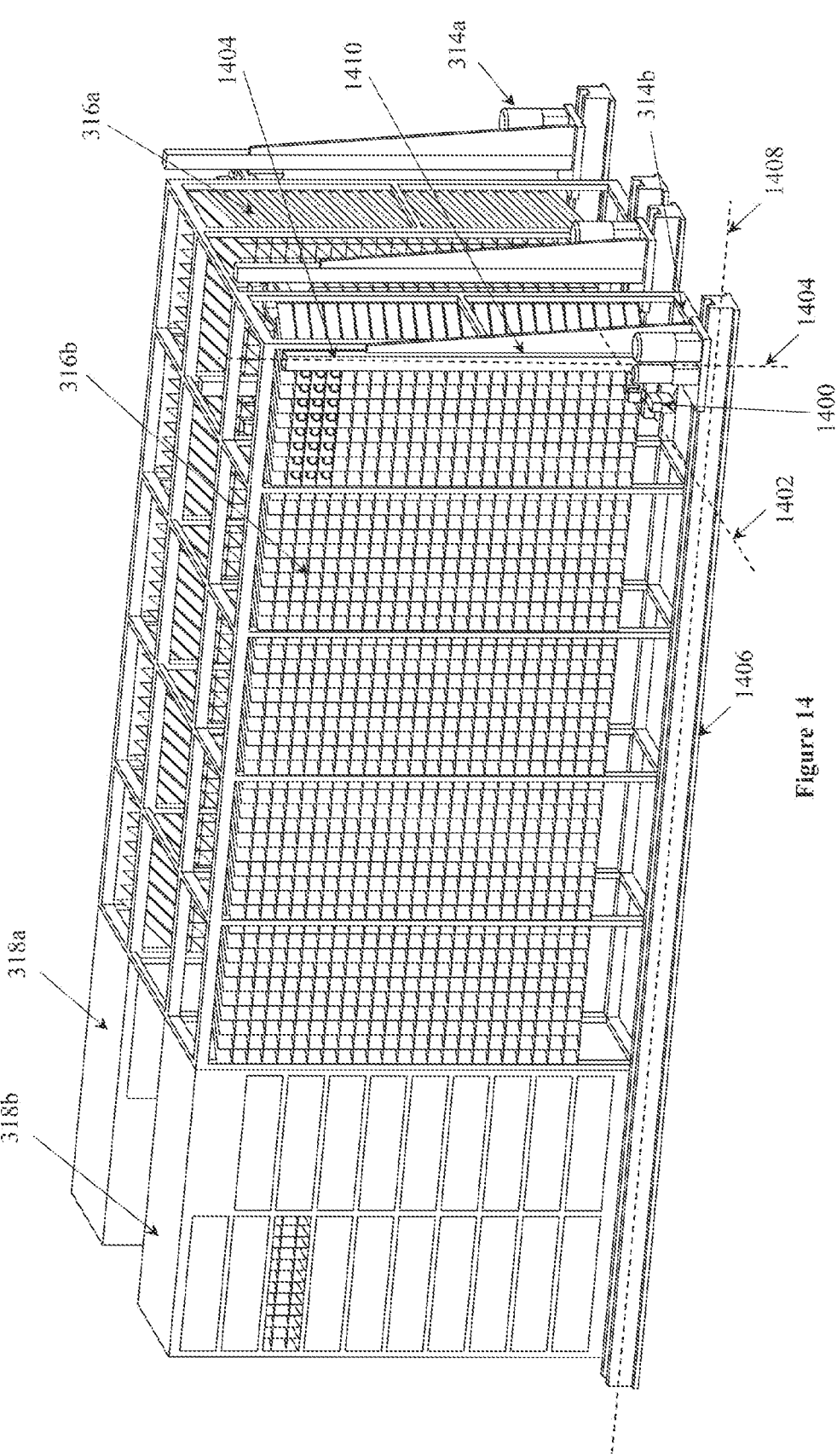
FIG. 14 is a rear perspective view of the restocking system and storage shelves of an automated retail store system according to a representative embodiment of the invention.

The restocking systems 314a/314b are both configured to operate in a similar manner. As shown in FIG. 14, according to one representative embodiment of the invention, the restocking system 314b include a retrieval arm 1400 that can be configured (under the control of one or more PLCs) for retrieving an item from the retrieval area 1210 of the sorting system 312b, and delivering the item to an identified storage channel (or target loading location or position) in the storage shelves 316b/318b. The retrieval arm 1400 can be controlled to move along a first longitudinal axis 1402 in three-dimensional space. Preferably, the first longitudinal axis 1402 is substantially perpendicular to a second longitudinal axis 1404 in three-dimensional space, and the first longitudinal axis 1402 can be configured to rotate to any position around the second longitudinal axis 1404.

The restocking system 314b also includes a first actuator (which includes one or more electronically controlled servo motors) that can be configured (under the control of one or more PLCs) for moving the retrieval arm 1400 (e.g. along a linear path 1406) to a target position along a third longitudinal axis 1408 in three-dimensional space. The restocking system 314b also includes a second actuator (which includes one or more electronically controlled servo motors) that can be configured (under the control of one or more PLCs) for moving the retrieval arm 1400 (e.g. along a linear arm 1410) to a target position along the second longitudinal axis 1404. Preferably, the linear arm 1410 (and second longitudinal axis 1404) is substantially perpendicular to the linear path 1406 (and third longitudinal axis 1408). By controlling the position of the linear arm 1410 along the linear path 1406, the second longitudinal axis 1404 can move to another (e.g. horizontally) parallel position along the third longitudinal axis 1408. By controlling the position of the retrieval arm 1400 along the linear arm 1410, the third longitudinal axis 1408 can move to another (e.g. vertically) parallel position along the second longitudinal axis 1404. The position of the retrieval arm 1400 (and first longitudinal axis 1402) is determined based on the position of the linear arm 1410 along the linear path 1406 (and thus based on the second and third longitudinal axes 1404/1408).

FIG. 15 is a front left perspective view of the first storage shelves 316a/316b according to a representative embodiment of the invention. Detail A is an expanded view of the subject matter in the circle marked A.

Each of the first storage shelves 316a/316b is configured to provide plurality of separate longitudinal storage channels 1500. The storage channels 1500 may be arranged in a linear matrix configuration of rows and columns. The storage channels 1500 may have different cross-sectional size or dimensions depending on the type of item to be stored (e.g. for storing items of different size, orientation and/or of irregular shape). Each storage channel 1500 may store quantities (e.g. one or more) of a particular item 1504. A particular item 1504 may be stored in one or more storage channels 1500 (e.g. to increase the storage capacity for that particular item). A partition 1502 may be provided to improve separation of items in adjacent storage channels 1500.

Each storage channel 1500 is preferably associated with a unique channel identifier. Preferably, each storage channel

1500 has means for providing its unique channel identifier to the retrieval arm of the restocking system 314a/314b and/or the retrieval system 320 (e.g. a unique bar code, QR code or RFID tag placed in close proximity to a loading end 1506a/1506b and/or delivery end 1508a/1508b of each storage channel 1500).

The retrieval arm 1212 (see FIG. 12) of the restocking system 314a/314b delivers items to a specific storage channel 1500 identified by the sorting system 312a/312b and inserts the item into loading end 1506a/1506b of the relevant storage channel 1500. Each storage channel 1500 is adapted so the items stored therein can freely move (e.g. slide) along the respective storage channel 1500. Each storage channel 1500 may be adapted so that the items stored therein are biased to move towards a delivery end 1508a/1508b of the storage channel 1500. For example, each storage channel 1500 may be positioned at an inclined angle so that the loading end 1506a/1506b of the storage channel 1500 is vertically higher than its delivery end 1508a/1508b. Preferably, the incline angle of each storage channel is sufficient for the items to freely move along that storage channel towards the delivery end only by each storage channel to freely move along by reason of said bias. The delivery end 1508a/1508b of each storage channel 1500 is adapted to retain the items in each storage channel 1500, and may be configured to dispense one or more items to a retrieval arm of the retrieval system 320. When an item 1504 is retrieved from the delivery end 1508a/1508b of a storage channel 1500, the remaining items in that storage channel 1500 are able to move towards the delivery end 1508a/1508b of a storage channel 1500.

Figure 16:
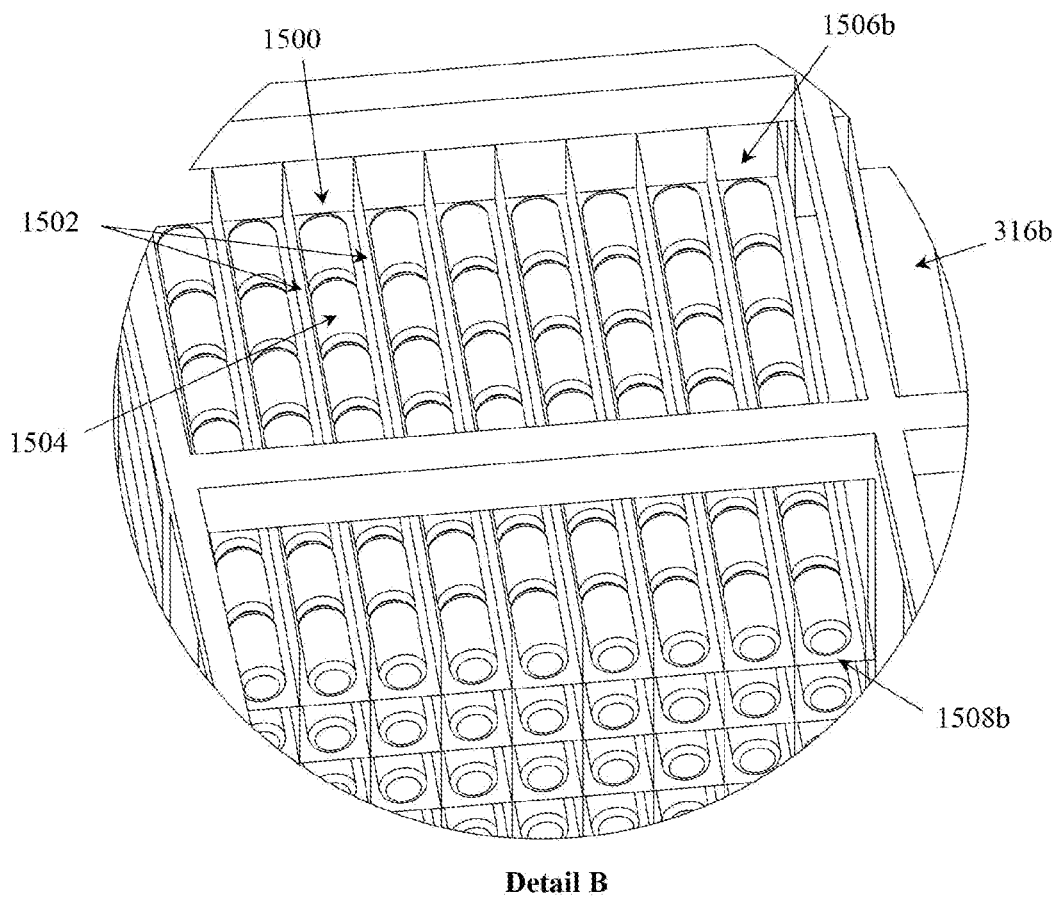
FIG. 16 is a rear left perspective view of the first storage shelves according to a representative embodiment of the invention.
Figure 16:
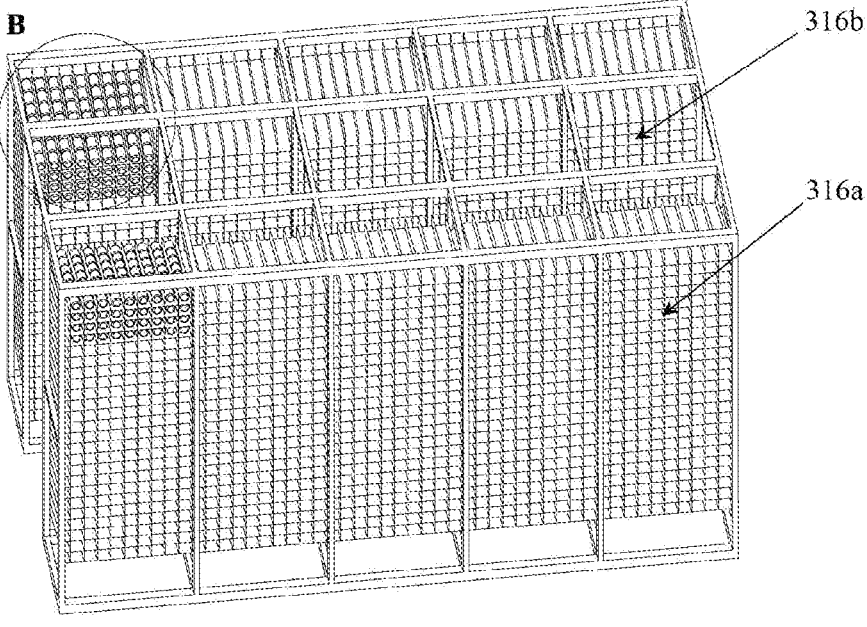

FIG. 16 is a rear left perspective view of the first storage shelves 316a/316b according to a representative embodiment of the invention. Detail B is an expanded view of the subject matter in the circle marked B. The same number is used in FIGS. 15 and 16 to refer to the same or corresponding features.

The first storage shelves 316a/316b are preferably used for storing items at an ambient or room temperature. The second storage shelves 318a/318b are preferably used for storing items in a temperature regulated (e.g. frozen, chilled or refrigerated) environment—e.g. at around 4 degrees Celsius.

Figure 17:
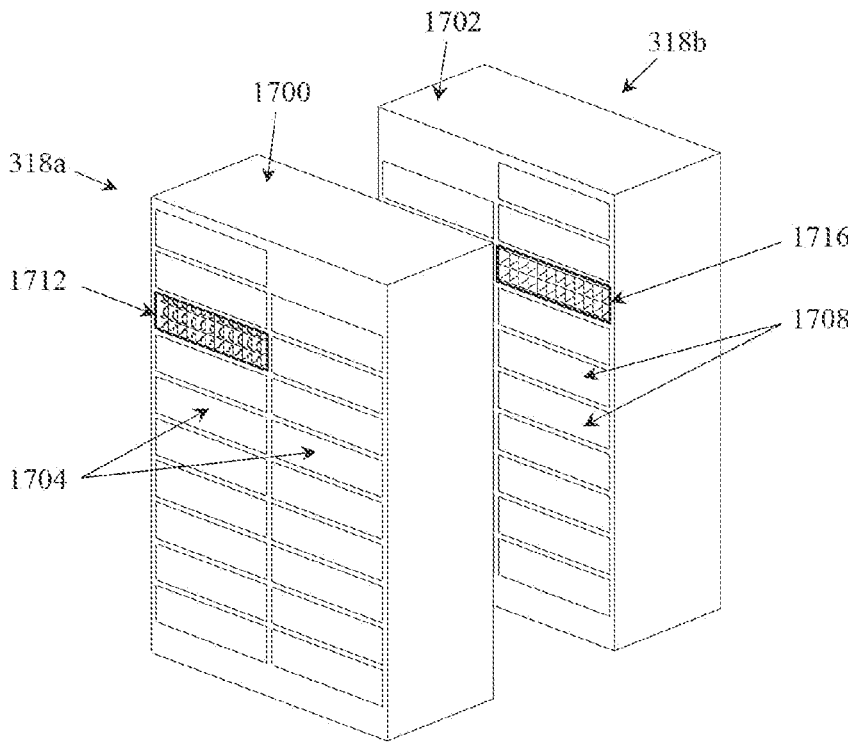
FIG. 17 is a front left perspective view of the second storage shelves according to a representative embodiment of the invention.
Figure 18:
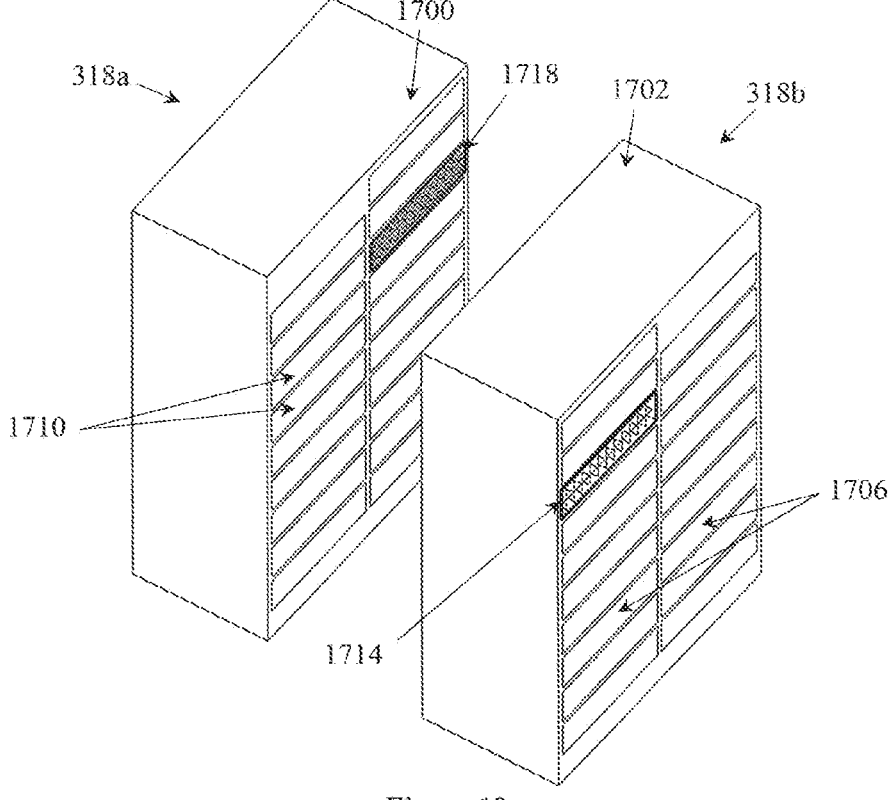
FIG. 18 is a front right perspective view of the second storage shelves according to a representative embodiment of the invention.

As shown in FIGS. 17 and 18, according to a representative embodiment of the invention, the second storage shelves 318a/318b are provided inside an enclosed storage compartment 1700/1702 that includes a temperature-controlled refrigeration unit for regulating the chilled or refrigerated environment within the compartment 1700/1702. Each enclosed storage compartment 1700/1702 is provided with one or more access barriers 1704/1706 provided on a loading side of each storage compartment 1700/1702, and one or more access barriers 1708/1710 provided on a dispensing side of each storage compartment 1700/1702. External access to the enclosed storage compartment 1700/1702 is controlled by the one or more access barriers. Each access barrier 1704/1706/1708/1710 may be a panel or door that can be independently configured (under the control of one or more PLCs) to be moveable between: (i) an open position that defines an opening (e.g. 1712/1714) on the loading side through which items can be placed (e.g. by the restocking system 314a/314b) into one or more of storage channels in the second storage shelves 318a/318b in the storage compartment 1700/1702, or defines an opening (e.g. 1716/1718) on the dispensing side through which items can be retrieved (e.g. by the retrieval system 320) from one or more of storage channels in the second storage shelves

318a/318b in the storage compartment 1700/1702; and (ii) a closed position to form an enclosed storage compartment in which the access barriers resist an escape of temperature controlled or refrigerated air from inside the storage compartment 1700/1702. Preferably, each access barrier 1704/1706/1708/1710 includes a seal member, such that when the access barrier is placed in a closed position, the seal member forms a fluid seal with the storage compartment 1700/1702 to further resist an escape of temperature controlled or refrigerated air from inside the storage compartment 1700/1702. Under the control of the store control system 300, an access barrier 1704/1706/1708/1710 may be placed in a locked state in which a portion of the access barrier engages a portion of its corresponding storage compartment (or another portion of the access barrier) to resist movement of the access barrier from a closed position to an open position. Under the control of the store control system 300, an access barrier 1704/1706/1708/1710 may be placed in an unlocked state in which a portion of the access barrier is disengaged from a portion of its corresponding storage compartment (or another portion of the access barrier) to allow movement of the access barrier from a closed position to an open position.

Figure 19:
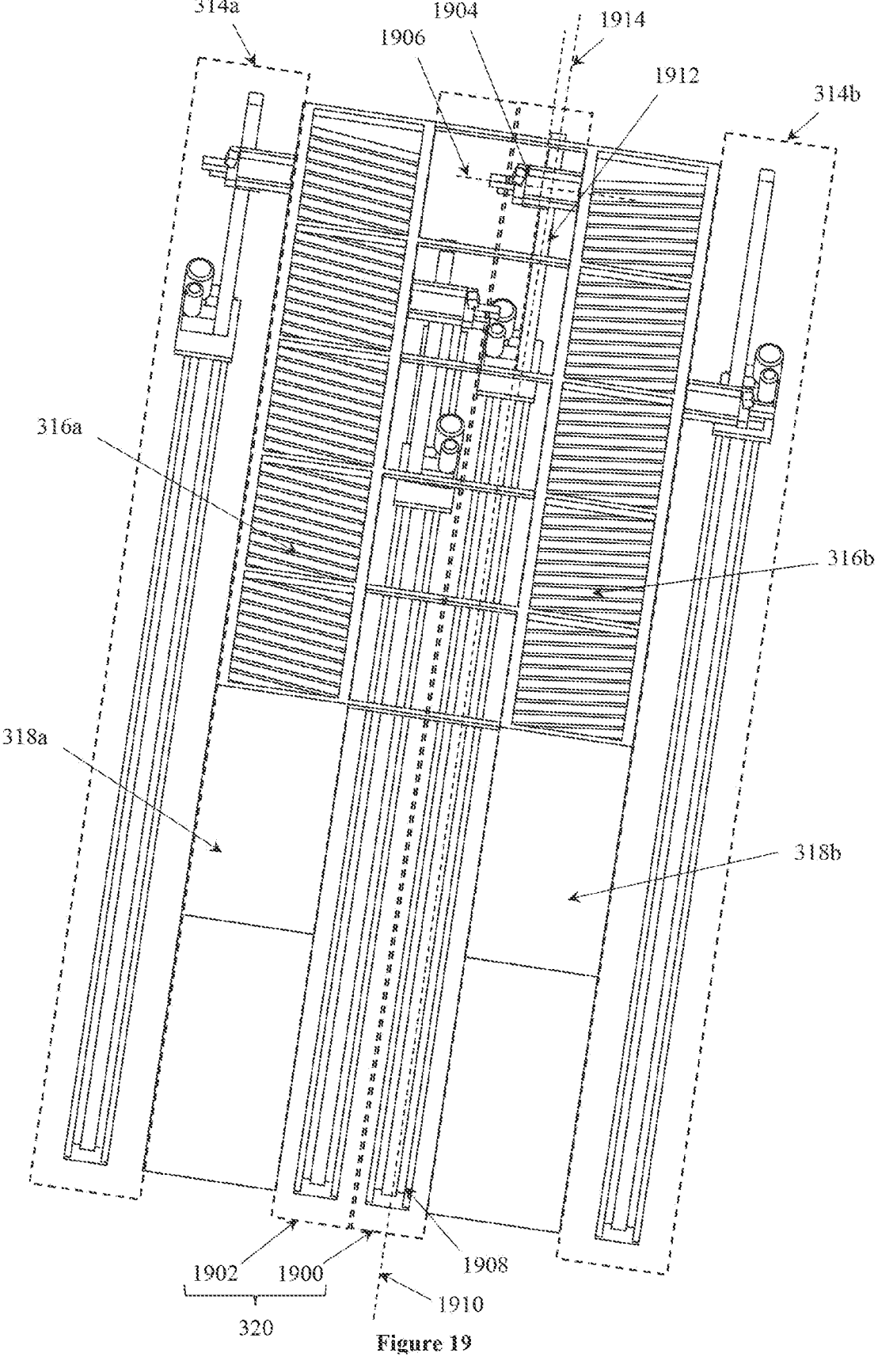
FIG. 19 is a top perspective view of the retrieval system, first and second storage shelves and restocking system according to a representative embodiment of the invention.

FIG. 19 is a top perspective view of the retrieval system 320, first and second storage shelves 316a/316b/318a/318b and restocking system 314a/314b of an automated retail store system 106 according to a representative embodiment of the invention. The retrieval system 320 is located between the two aisles of storage shelves, where shelves 316a and 318a corresponding to a first aisle of shelves and shelves 316b and 318b corresponding to a second aisle of shelves. According to a representative embodiment as shown in FIG. 19, the retrieval system 320 may consist of two separate retrieval systems 1900/1902 which are identical with each other. The retrieval systems 1900/1902 may together be referred to as a retrieval system 320. The retrieval systems 1900/1902 are adapted to retrieve items from either aisle of the storage shelves 316a/316b/318a/318b, which provides redundancy in case one of the retrieval systems 1900/1902 fail. The retrieval systems 1900/1902 are preferably configured to work in a coordinated way to speed up the item retrieval process. In another representative embodiment, the retrieval system 320 may consist of only one retrieval system (e.g. either 1900 or 1902).

As shown in FIG. 19, according to one representative embodiment of the invention, the retrieval system 1900 includes a retrieval apparatus including a retrieval arm 1904 that can be configured (under the control of the store control system 300 and/or one or more PLCs) for retrieving one or more items from a storage channel 1500 in any of the first and second storage shelves 316a/316b/318a/318b, or delivering the retrieved items into a delivery container 900 or courier container 902 in the handover area 322. The retrieval arm 1904 can be controlled to move along to a first longitudinal axis 1906 in three-dimensional space.

The retrieval system 1900 also includes a positioning apparatus including a first actuator, second actuator, linear path 1908 and linear arm 1912. The first actuator (which includes one or more electronically controlled servo motors) that can be configured (under the control of one or more PLCs) for moving the retrieval arm 1904 (e.g. along a linear path 1908) to a target position along to a second longitudinal axis 1910 in three-dimensional space. The retrieval system 1900 also includes a second actuator (which includes one or more electronically controlled servo motors) that can be configured (under the control of one or more PLCs) for moving the retrieval arm 1904 (e.g. along a linear arm 1912) to a target position along a third longitudinal axis 1914 in three-dimensional space. Preferably, the linear arm 1912 (and third longitudinal axis 1914) is substantially perpendicular to the linear path 1908 (and second longitudinal axis 1910). By controlling the position of the linear arm 1912 along the linear path 1908, the third longitudinal axis 1914 can move to another (e.g. horizontally) parallel position along the second longitudinal axis 1910. By controlling the position of the retrieval arm 1904 along the linear arm 1912, the second longitudinal axis 1910 can move to another (e.g. vertically) parallel position along the third longitudinal axis 1914. The position of the retrieval arm 1904 (and first longitudinal axis 1906) is determined based on the position of the linear arm 1912 along the linear path 1908 (and thus based on the second and third longitudinal axes 1910/1914).

The retrieval system 1900 can be configured (under the control of the store control system 300 and/or one or more PLCs) so that positioning apparatus moves the retrieval apparatus to a target retrieval location (or position) proximate to a delivery end of a target storage channel 1500 for storing an item to be retrieved. When positioned at the target retrieval location, the retrieval apparatus retrieves one or more selected items from the target storage channel 1500. The positioning apparatus then moves the retrieval apparatus to a drop-off location (or position) in three-dimensional space (e.g. in the handover area 322) proximate to a delivery container for receiving items pertaining to a customer's order. When positioned at the drop-off location, the retrieval apparatus releases the retrieved items into the delivery container.

Figure 20:
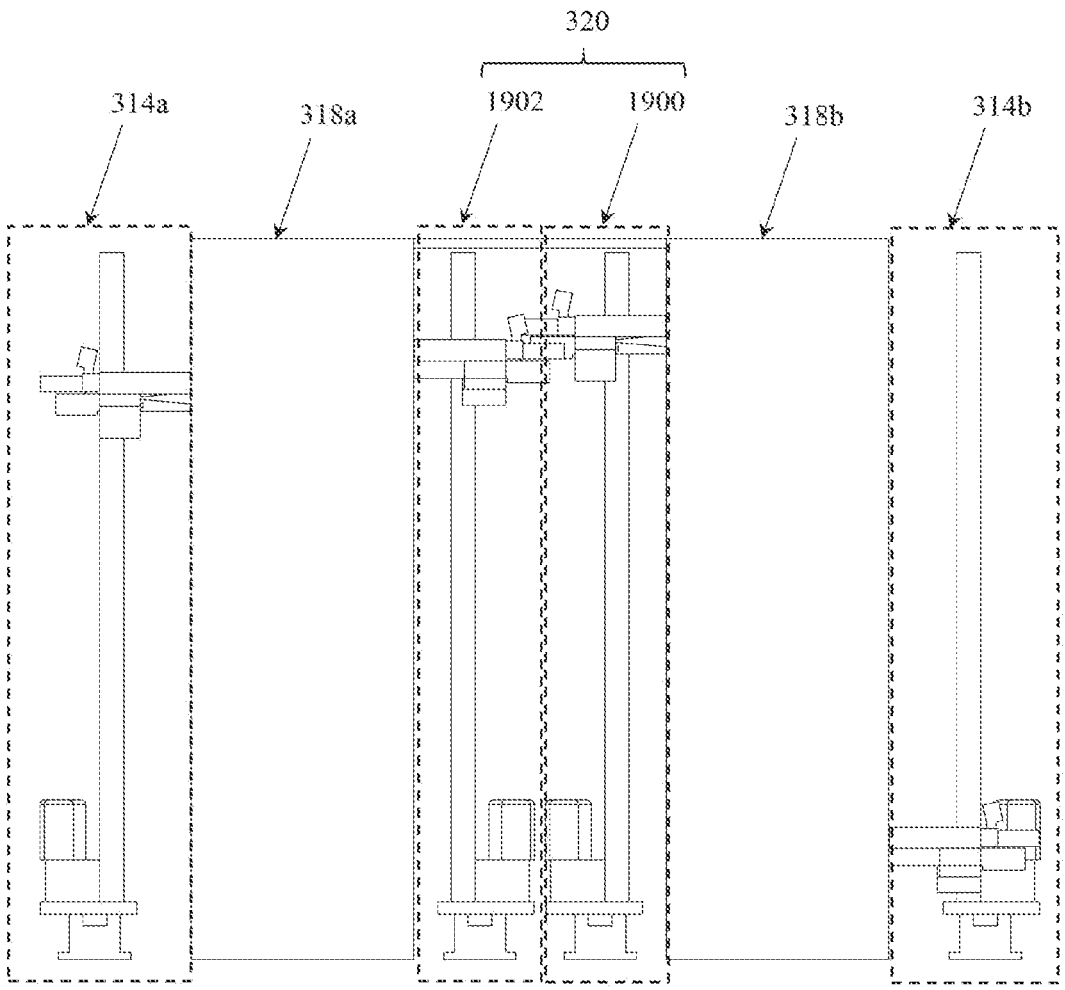
FIG. 20 is a front view of the retrieval system, first and second storage shelves and restocking system according to a representative embodiment of the invention.

FIG. 20 is a front view of the retrieval system 320, first and second storage shelves 316a/316b/318a/318b and restocking system 314a/314b of an automated retail store system 106 according to a representative embodiment of the invention. The same number is used in FIGS. 19 and 20 to refer to the same or corresponding features.

Figure 13:
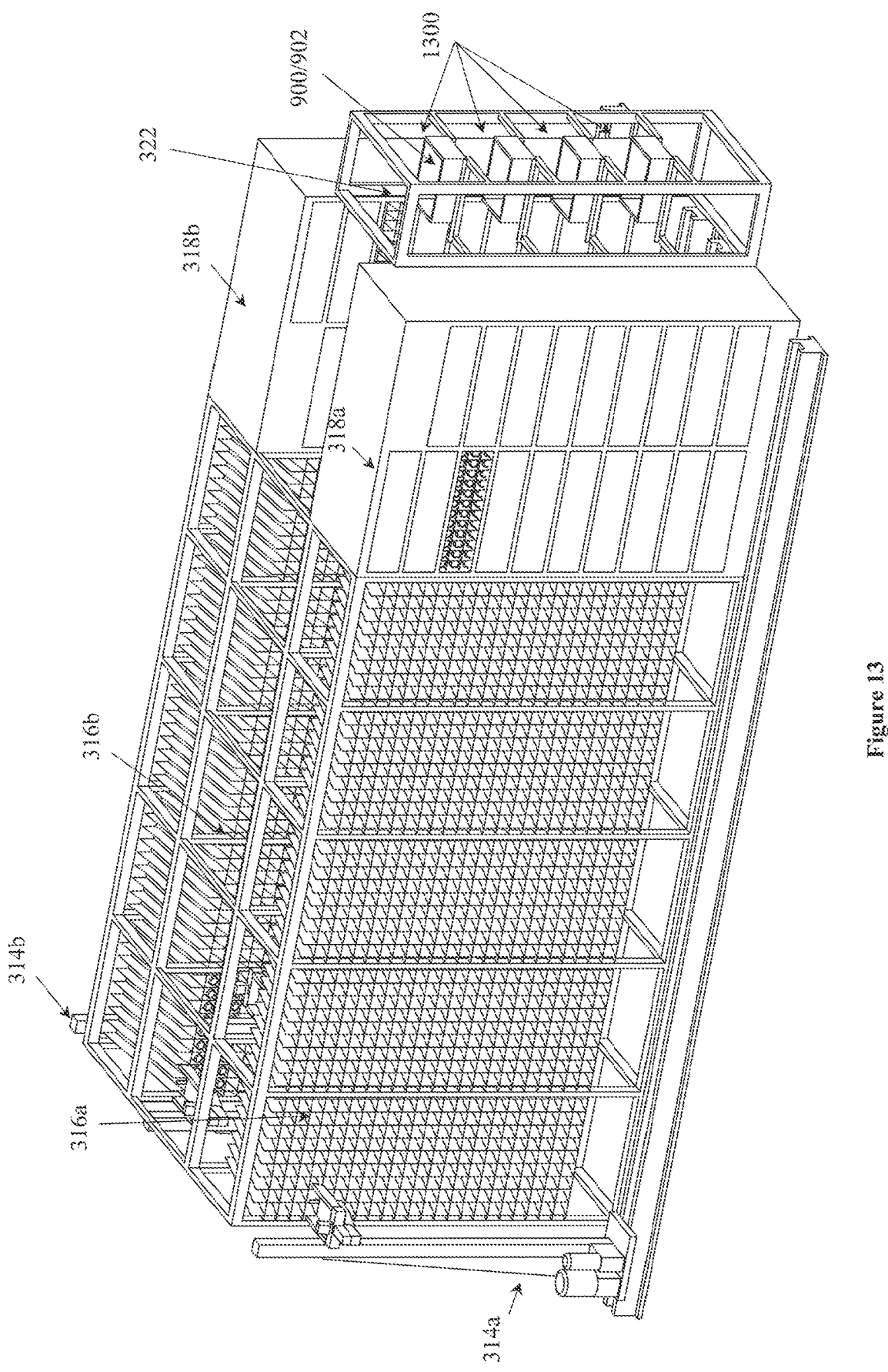
FIG. 13 is a front left perspective view of the restocking system, storage shelves and handover area of an automated retail store system according to a representative embodiment of the invention.

FIG. 13 is a front left perspective view of a selection of internal components and electromechanical subsystems of an automated retail store system 106 according to a representative embodiment of the invention. The handover area 322 refers to an area where empty delivery containers or courier containers are placed for receiving one or more items retrieved by the retrieval system 320. For example, the items retrieved based on order information for a customer's order are placed into one or more delivery containers. Rejected items retrieved based on control messages from the automated retail store management system 108 (e.g. items that have expired or are about to expire—such as being within a predetermined period of the item's expiry date) are placed into one or more "reject" courier containers.

As shown in FIG. 13, according to one representative embodiment of the invention, the handover area 322 may be provided in a form of a shelf with a plurality of layers 1300, where each layer 1300 of the shelf is adapted to hold at least one delivery container 900 or courier container 902 for receiving items retrieved by the retrieval system 320.

Further details on other exemplary aspects of the automated retail store system 106 and retail management system 102 which may form part of different representative embodiments of the invention are described below.

Storage Shelves

According to one representative embodiment of the invention, the shelves are preferably arranged longitudinally in two aisles (see FIG. 20). For example, a first storage shelf 316a and a second storage shelf 318a may be arranged longitudinally and adjacent to each other to form a first left aisle of shelves (see FIG. 5). Similarly, another first storage shelf 316b and another second storage shelf 318b may be arranged longitudinally and adjacent to each other to form a second right aisle of shelves. Preferably, the aisles of shelves 316a, 316b, 318a, 318b are arranged in parallel with each other. Preferably, an automated retail store system 106 may have more than two aisles of shelves, depending on the size of the system. Preferably, the height of the shelves 316a, 316b, 318a, 318b extend to the full internal height of a retail site (e.g. a store) to maximise the use of vertical space.

The present invention can work with any configuration of storage shelves 316a/316b/318a/318b and storage channels 1500 in a three-dimensional space. Hence, it is not essential for the storage shelves 316a/316b/318a/318b to be arranged in a longitudinal aisle configuration, or for the storage channels 1500 to be in a linear configuration.

Retrieval System

In the context of the present invention, a delivery container 900 refers to a container that is used to carry or convey one or more items within the automated retail store system 106. For example, a delivery container may be a tote box or tray, or any other suitably shaped container. A courier container 902 refers to a container that is used to carry or convey one or more items from the supply warehouse to the automated retail store system 106, or vice versa. A courier container is also referred to as a restocking container (if the delivery container contains items to be loaded into the automated retail store system 106) or as a reject container (if the delivery container contains items to be removed from the automated retail store system 106). Preferably, each delivery container is made from a substantially rigid material (e.g. PVC plastic) that resists deformation in shape. According to one representative embodiment, delivery containers 900 and courier containers 902 are of substantially the same physical dimensions (e.g. in terms of length, width and depth). According to another representative embodiment, delivery containers 900 and courier containers have different physical dimensions.

Each retrieval system 320/1900/1902 is configured to operate under the control of said processor 204 of the store control system 300 and/or one or more PLCs. The retrieval system 320/1900/1902 is configured to move the retrieval arm (or retrieval apparatus) to a retrieval location (or position) in three-dimensional space proximate to a delivery end of a target storage channel 1500 storing an item to be retrieved (e.g. an item identified in the customer's order information).

According to one representative embodiment of the invention, the retrieval apparatus may include one or more sensors—such as a camera sensor for obtaining sensor input data in the form of image data, and/or one or more of an optical, mechanical, magnetic, infra-red sensor for obtaining sensor input data representing one or more physical, spatial or data parameters associated with the retrieval apparatus or a storage channel 1500 (e.g. a position of the apparatus in three-dimensional space, proximity data representing a presence of any objects or obstacles proximate to the retrieval apparatus that may interfere with its movement or operation, a distance of the retrieval apparatus from or relative to a particular object such as an item in the retrieval area 1208/1210 of the sorting system 312a/312b or an end of a storage channel 1500, a unique identifier associated with a storage channel 1500, etc.). The store control system may control the position of the retrieval apparatus in three-dimensional space based input from one or more of the above sensors. For example, the store control system 300 controls or adjusts the retrieval apparatus of the retrieval system 1900 to retrieve one or more items from the target storage channel 1500 only when the store control system

300 determines that the obtained identifier is associated with the storage channel 1500 for storing the items to be retrieved.

The retrieval system 320/1900/1902 is preferably configured so that, when the retrieval arm (or retrieval apparatus) is positioned at the retrieval position, the store control system 300 (working with a PLC) receives sensor input data from a sensor (e.g. a camera sensor) and makes automatic fine adjustments to position of the retrieval apparatus in three-dimensional space to ensure the item is retrieved or placed without colliding with a storage shelf 316a, 316b, 318a, 318b or other objects or obstacles. For example, the sensor may be adapted to detect one or more visual characteristics of a storage channel 1500 (such as a distance between the partitions 1502 (see FIG. 15/16) on opposing sides of the storage channel 1500), based on which the store control system 300 determine the retrieval arm's relative distance from that storage channel 1500 and/or the retrieval arm's alignment or position in three-dimensional space relative to the storage channel 1500, and uses one or more of these determined parameters to make fine (e.g. small or incremental) adjustments to the position of the retrieval arm in three-dimensional space relative to the storage channel 1500.

Preferably, before the retrieval apparatus retrieves an item from the target storage channel 1500, the store control system 300 (working with a PLC) receives sensor input data from a sensor (e.g. a camera sensor) representing a unique identifier (such as a barcode) associated with the target storage channel 1500. The store control system 300 then determines, based on the sensor input data received, whether the retrieval arm is at the correct location for picking up the item(s) instructed by the store control system 300. The store control system 300 controls the retrieval arm to retrieve one or more of the item from the target storage channel 1500 only when the store control system 300 determines that the obtained identifier is associated with a storage channel 1500 for storing the item to be retrieved.

The retrieval arm, when positioned at the retrieval location (or position), is configured to be controlled by the store control system 300 (working with a PLC) to retrieve one or more of said item from the target storage channel 1500 at that retrieval location. The store control system 300 (working with a PLC) then controls the positioning apparatus to move the retrieval arm to a drop-off location (or position) in three-dimensional space proximate to a delivery/courier container for said order. The retrieval apparatus, when positioned at the drop-off location, is controlled to release the retrieved items from the retrieval arm into the delivery/courier container.

For example, the drop-off location is an empty delivery container (e.g. one or more of the empty delivery containers placed in a handover rack 1300 in the handover area 322) for receiving all (or at least some of) the items in a customer's order information. If the customer has ordered a large quantity of items, it is possible for the items for that order to be placed in two or more different delivery containers. The automated retail store system 106 will recognise all such delivery containers to be part of the same order by a customer.

Conveyor System

According to a representative embodiment of the invention, each automated retail store system 106 includes a conveyor system configured to operate under the control of the store control system 300 (working with a PLC) to at least: (i) move a delivery container containing items for a customer's order to either a storage rack or a locker compartment based on the pickup time indicated in the order information for that order; and (ii) move a delivery container containing items for a customer's order from the storage rack to an available locker compartment based on the pickup time indicated in order information for that order.

The conveyor system 310 enables its retrieval arm 904 to traverse the full height and width of the handover area 322, storage rack 304, customer locker compartments 306 and courier locker compartments 308.

Once all of the items identified in the customer's order information have been retrieved and placed into one or more delivery containers in the handover rack 1300 in the handover area 322, the retrieval of items for that order is treated as complete. The store control system 300 then controls the conveyor system 310 to retrieve the completed (or filled) delivery container(s) for the order from the handover area 322 and move them to an available customer locker compartment 306 or an available compartment in the storage rack 304 based on the pickup time indicated in the order information for that order. A customer locker compartment 306 is available if there is no delivery container inside the locker compartment. Similarly, a compartment in the storage rack 304 is available if there is no delivery container inside that compartment. The availability of a customer locker compartment 306 and a compartment in the storage rack 304 is determined before (or preferably at the time when) the conveyor system 310 retrieves a completed (or filled) delivery container for an order from the handover area 322.

When the store control system 300 checks and determines that a customer locker compartment 306 is available, and the time at which this check was made is within a certain scheduled time period before (and determined based on) the pickup time identified in the order information (i.e. the customer is about to arrive to pickup), the store control system 300 (working with a PLC) controls the conveyor system 310 to move the delivery container(s) for that order to corresponding available customer locker compartments 306. Any delivery containers for that order that cannot be placed into an available customer locker compartment 306 will be placed in an available compartment in the storage rack 304.

When the store control system 300 checks the availability of customer locker compartments 306, and the time at which this check was made is outside the above scheduled time period before (and determined based on) the pickup time identified in the order information (i.e. there is still time before the customer arrives to pickup), the store control system 300 (working with a PLC) controls the conveyor system 310 to move the delivery container(s) for that order to corresponding available compartments in the storage rack 304.

At the pickup time (or at a scheduled time period before (and determined based on) the pickup time identified in the order information), the store control system 300 (working with a PLC) controls the conveyor system 310 to move the delivery container(s) for that order to an available customer locker compartment 306. Any delivery containers for that order that cannot be placed into an available customer locker compartment 306 will be placed in an available compartment in the storage rack 304.

If the customer is late and has not picked up the ordered items within a scheduled time period after (and determined based on) the pickup time indicated in the order information, the store control system 300 (working with a PLC) controls the conveyor system 310 to move the delivery container(s) for that order from the customer locker compartment(s) 306 to an available compartment in the storage rack 304. The store control system 300 controls the conveyor system 310 to move such delivery container(s) back to an available customer locker compartment 306 when the customer arrives at the automated retail store system 106 and has successfully completed a customer or order verification process with the system 106.

Preferably, the retrieval mechanism of the conveyor system 310 includes a sensor (e.g. a barcode reader, QR code reader, RFID sensor etc.), where the store control system 300 (working with a PLC) receives sensor input data from the sensor to obtain a unique identifier (e.g. a barcode, QR code or RFID tag) associated with each delivery container. The store control system 300 determines based on such sensor input data whether the retrieval mechanism of the conveyor system 310 has retrieved (or is about to retrieve) the correct delivery container as intended by the store control system's 300 instructions.

Storage Rack

The storage rack 304 includes one or more storage compartments, each being adapted to removably receive a single delivery container 900 or courier container 902. Delivery containers that have been filled with items in a customer's order may be stored in a compartment in the storage rack 304 until the customer comes to pick up. Each storage compartment of the storage rack 304 may include one or more sensors for detecting a presence or absence of a container in that storage compartment. Each storage compartment of the storage rack 304 may include one or more actuating components for retaining a container received in (and/or releasing container from) that storage compartment.

Customer Locker Compartments

Each automated retail store system 106 has one or more customer locker compartments 306, each being adapted to removably receive a single delivery container 900.

The customer locker compartments 306 are located at the front of the automated retail store system 106, and forms part of the customer facing portion of the automated retail store system 106. Preferably, when the customer is ready to pickup their order, the delivery container 900 containing the items ordered by the customer is moved to an available customer locker compartment 306.

Preferably, the front (customer facing side) of each customer locker compartment 306 includes a transparent touch-screen display that displays relevant information to the customer and allows the customer to verify themselves. Preferably, a customer locker compartment 306 remains in a closed position and locked state until customer's arrival is successfully verified (or a unique code or identifier associated with said order has been successfully verified) and are ready to pick up. Preferably, when the customer's arrival is verified, the specific customer locker compartment 306 containing items that the customer has ordered is unlocked and automatically placed in an open position. Inside that customer locker compartment 306 is a delivery container 900 containing the items that the customer ordered. When the customer has finished picking their items from the customer locker compartment 306 and returns an empty delivery container 900 to that customer locker compartment 306, the access barrier (e.g. a panel or door) to that customer locker compartment 306 is automatically placed in a closed position and locked state.

Preferably, the access barrier for each customer locker compartment 306 is adapted to be weather resistant. For example, each access barrier may include a seal member such that, when the access barrier is closed, the seal member forms a fluid seal around the access barrier to resist external water, dust and/or air from entering the customer locker compartment 306.

Courier Locker Compartments

The courier locker compartments 308 are preferably located above and/or below the customer locker compartments 306 in the shop front portion 402. The courier locker compartment 308 locations may be less convenient for a typical customer to reach, but are within reach of a courier (e.g. a person that delivers restock items to the automated retail store system 106). Courier locker compartments 308 are used for placing courier containers 902 which are filled with items to restock the storage shelves 316a/316b/318a/318b when they run low.

Preferably, the courier locker compartments 308 are locked until it is verified that a courier is ready to place a courier container 902 with restock items into a courier locker compartment 308. The courier does not have to enter an automated retail store system 106 in order to stock the items for that system 106.

Preferably, if there are any empty or damaged courier containers 902 within the automated retail store system 106, the conveyor system 310 is controlled by the store control system 300 to place such courier containers 902 into an available courier locker compartment 308 for the courier to pickup and return to the supply warehouse.

Sorting System

The sorting system 312a/312b is preferably located between the conveyor system 310 and the storage shelves 316a/316b/318a/318b. According to one representative embodiment, there is a separate sorting system 312a/312b for each aisle of storage shelves 316a/316b/318a/318b in the automated retail store system 106.

According to one representative embodiment, each sorting system 312a/312b may include a robotic arm, one or more 3D cameras, one or more barcode readers, a place to receive and place a "restocking" courier container 902 with one or more restocking items, and a place to receive a "reject" courier container 902 for receiving one or more restocking items rejected by the sorting system 312a/312b.

When a "restocking" courier container 902 is received in the sorting system 312a/312b, a sensor (e.g. 3D camera) scans the contents of the "restocking" courier container 902 to identify items to pickup from that container. The retrieval apparatus (e.g. robotic arm) is controlled by the store control system 300 to pickup an item from the "restocking" courier container 902 and move it in front of a barcode reader, which scans a barcode on the item and obtains (based on the barcode) a unique item identifier for that item. If the retrieval apparatus has picked an item that needs to be restocked into a shelf 316a/316b/318a/318b of the automated retail store system 106, the sorting system 312a/312b provides the item to the restocking system 314a/314b. Based on the unique item identifier for the item, the restocking system 314a/314b is controlled (by the store control system 300 and one or more PLCs) to place the item in a corresponding storage channel 1500 for that item. If the store control system 300 determines that the retrieval apparatus has picked an item that cannot be identified, or does not need to be restocked into a shelf 316a/316b/318a/318b of the automated retail store system 106, the sorting system 312a/312b places the item into a "reject" courier container 902. Otherwise, if the retrieval apparatus has picked an item that needs to be restocked, the store control system 300 controls the restocking system 314a/314b to place that item into its associated storage channel 1500. Once all items in the "restocking" courier container 902 have been processed, the store control system 300 controls the conveyor system 310 to retrieve any "reject" courier containers 902 from the sorting system 312*a*/312*b* and place them in an available courier locker compartment 308 for a courier to pickup and return the items to the supply warehouse. The store control system 300 may also send a response message to the automated retail store management system 108 requesting the automated retail store management system 108 to instruct a courier to pickup the items in "reject" courier containers 902 from a specific automated retail store system 106.

Restocking System

According to one representative embodiment, there is a separate restocking system 314*a*/314*b* for each aisle of storage shelves 316*a*/316*b*/318*a*/318*b* in the automated retail store system 106. Each restocking system 314*a*/314*b* is configured such that its retrieval arm 1212/1400 traverses the height and length of a loading side of the storage shelves 316*a*/316*b*/318*a*/318*b*.

Preferably, after the sorting system 312*a*/312*b* provides an item to the restocking system 314*a*/314*b*, the retrieval arm 1212/1400 of the restocking system 314*a*/314*b* moves the item to the correct storage channel 1500 for storing that item, and places the item into that storage channel 1500.

According to one representative embodiment, the retrieval arm 1212/1400 of the restocking system 314*a*/314*b* may include a sensor (e.g. a camera sensor and/or a laser sensor) for determining a level of stock in a selected storage channel 1500. For example, the sensor may determine a distance between the last item in the selected storage channel 1500 relative to the sensor positioned proximate to a loading end 1506*a*/1506*b* of the selected storage channel 1500. The store control system 300 may then determine a level of stock in the selected storage channel 1500 based on a distance determined based on sensor input received by the sensor.

According to another representative embodiment, the retrieval arm 1212/1400 of the restocking system 314*a*/314*b* may include a sensor (e.g. a camera sensor) for receiving sensor input data (e.g. image data) based on which the store control system 300 makes automatic fine adjustments to position of the retrieval arm 1212/1400 in three-dimensional space to ensure the item is retrieved or placed without colliding with a storage shelf 316*a*, 316*b*, 318*a*, 318*b* or other objects or obstacles. For example, the sensor may be adapted to detect one or more visual characteristics of a storage channel 1500 (such as a distance between the partitions 1502 on opposing sides of the storage channel 1500), based on which the store control system 300 determine the retrieval arm's relative distance from that storage channel 1500 and/or the retrieval arm's alignment or position in three-dimensional space relative to the storage channel 1500, and uses one or more of these determined parameters to make fine (e.g. small or incremental) adjustments to the position of the retrieval arm in three-dimensional space relative to the storage channel 1500.

Stock out Process

Figure 21:
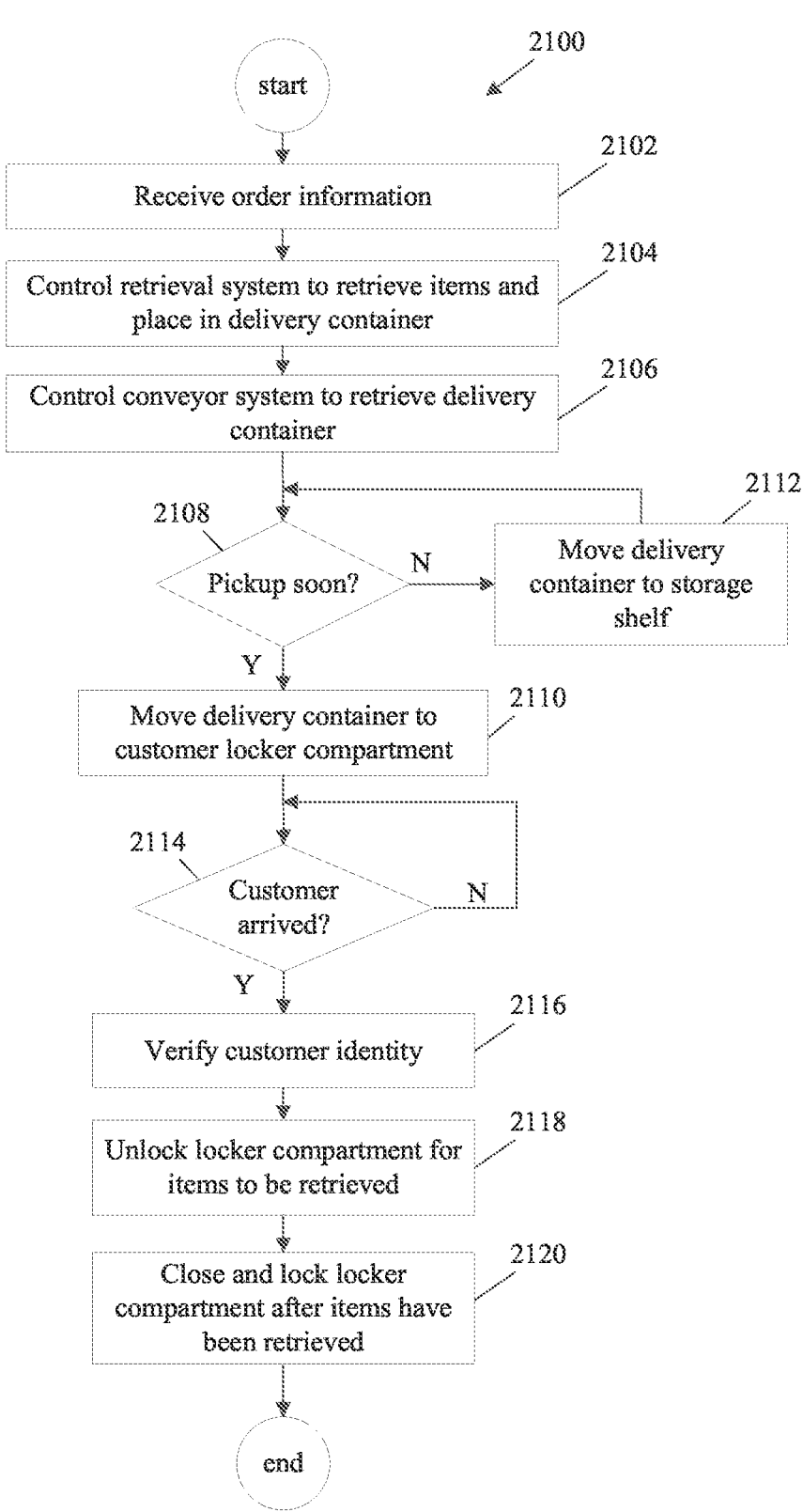
FIG. 21 is a flow chart illustrating an exemplary stock out process performed by an automated retail store system.

The following is a description of an exemplary stock out (i.e. item retrieval) process performed by an automated retail store system 106 and the retail management system 102. FIG. 21 is a flow chart of the key steps of the stock out process 2100 performed by an automated retail store system 106 (under the control of its store control system 300).

1. The customer initially places an order to purchase one or more items through the online shopping platform 118 (e.g. using an application on a customer client device 120) or at a self-order kiosk interface provided by the store control system 300 of an automated retail store system 106. For orders placed through the online shopping platform 118, the customer may select an automated retail store system 106 in different geographic locations for picking up their items. For orders placed through the online shopping platform 118, the customer may also indicate a pickup time for picking up their ordered items. The customer will also pay for the ordered items through the same medium in which the order was made.

2. Once the order is placed by the customer, the order information is provided to the automated retail store management system 108. The automated retail store management system 108 stores the order information and determines an optimum time (before the pickup time) for instructing the selected automated retail store system 106 to stock out or retrieve the items ordered by the customer.

3. When it is time for the selected automated retail store system 106 to stock out the items ordered by the customer, the automated retail store management system 108 sends a control message including the order information to the store control system 300 of the selected automated retail store system 106 (see step 2102). The order information includes at least a unique identifier associated with the order (e.g. order number), a unique item identifier and a required quantity for each item ordered by the customer. Based on unique item identifier for each item in the order information, the store control system 300 of the selected automated retail store system 106 may determine a corresponding target storage channel 1500 for retrieving each item (or alternatively this information may be included as part of the control message from the automated retail store management system 108). The store control system 300 of the selected automated retail store system 106 may also assign a particular location of a delivery container 900 in the handover area 322 for receiving the items associated with the customer's order (or alternatively this information may be included as part of the control message from the automated retail store management system 108).

4. The conveyor system 310 retrieves an empty delivery container 900 (e.g. from the storage rack 304 or from a customer locker compartment 306) and places it in the assigned location on the handover area 322. The retrieval system 320 then retrieves each item in the order information from the identified storage channels 1500 of the storage shelves 316*a*/316*b*/318*a*/318*b* (see step 2104).

5. Once all items identified in the order information have been retrieved from the storage shelves 316*a*/316*b*/318*a*/318*b*, the conveyor system 310 retrieves the filled delivery container 900 from the handover area 322 (see step 2106). If the customer has arrived or is about to arrive (e.g. at the pickup time, or at or within a predetermined time period before the pickup time) (see step 2108), the store control system 300 controls the conveyor system 310 to move the delivery container 900 for the customer's order to an available customer locker compartment 306 (see step 2110). Otherwise, the store control system 300 controls the conveyor system 310 to move the delivery container 900 for the customer's order to an available storage compartment in the storage rack 304 (see step 2112).

6. If the delivery container 900 for the customer's order has been placed in the storage rack 304, and the customer is about to arrive (e.g. at or within a predetermined time period before the pickup time), the store control system 300 controls the conveyor system 310 to move the delivery container 900 for the customer's order from the storage rack 304 to an available customer locker compartment 306.

7. When the customer has arrived and the automated retail store system 106 verifies that the customer will pickup their order (see step 2114), an identity of the customer is checked and verified against the customer's data stored in the user management system 124 (see step 2116). Once the customer's identity has been verified, the access barrier to the customer locker compartment 306 storing the customer's ordered items is configured to unlock and open automatically, allow the customer to access the ordered items in the delivery container 900 stored therein (see step 2118).

8. When the customer has retrieved all of the ordered items from the delivery container 900, the empty delivery container is returned to the customer locker compartment 306, and the access barrier for that customer locker compartment 306 is automatically configured to a closed and locked position (see step 2120).

Restock Process

Figure 22:
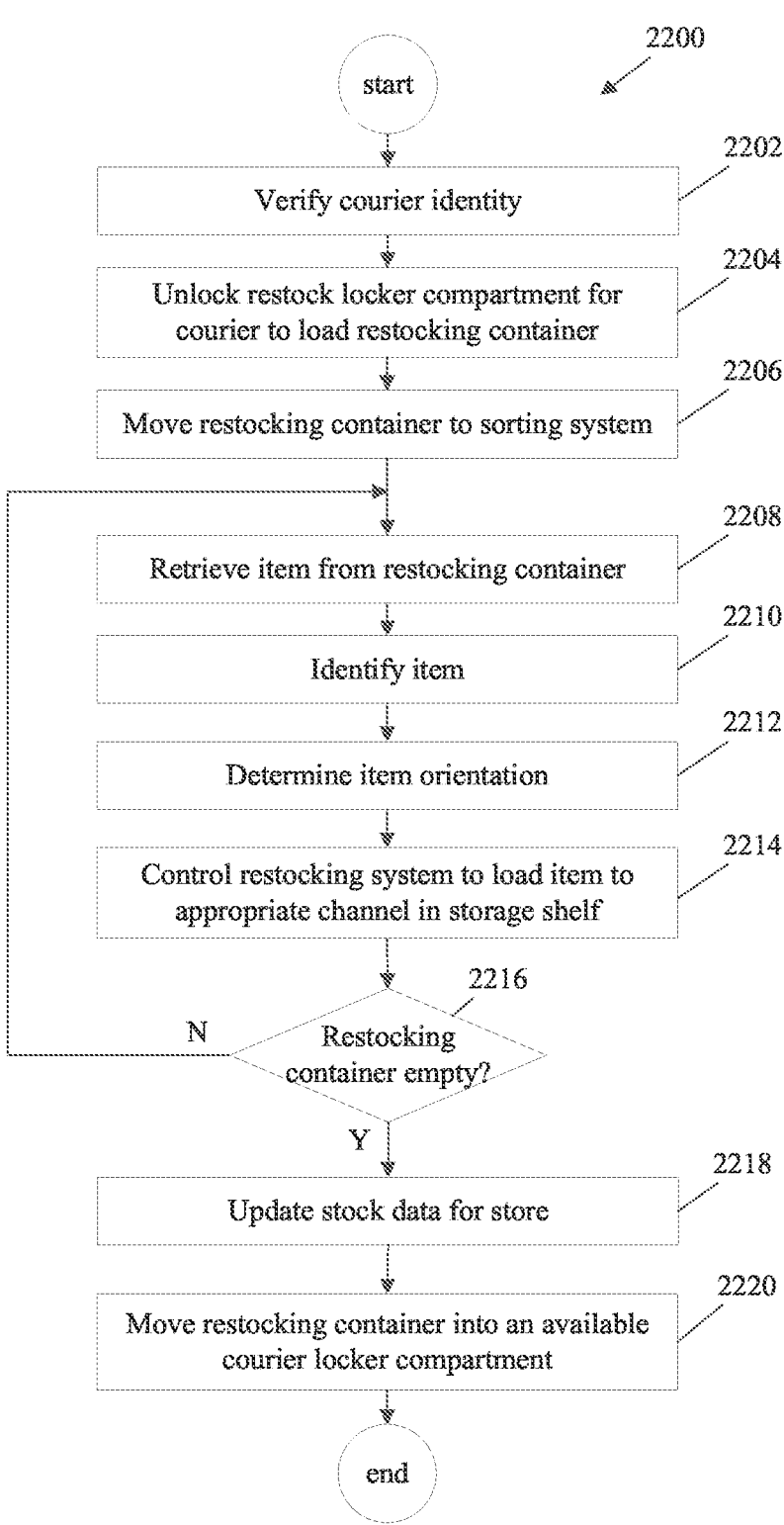
FIG. 22 is a flow chart of an exemplary restocking process performed by an automated retail store system.

The following is a description of an exemplary restock process performed by an automated retail store system 106 and the retail management system 102. FIG. 22 is a flow chart of the key steps of the restock process 2200 performed by an automated retail store system 106 (under the control of its store control system 300).

1. The stock level of each item in the storage shelves 316a/316b/318a/318b of an automated retail store system 106 can be determined in one of two ways: (i) by determining a quantity of the item restocked or refilled into the automated retail store system 106, and subtracting a quantity of that item sold from the automated retail store system 106; or (ii) receiving sensor input data from a sensor (e.g. camera sensor) in the retrieval arm 1212/1400 of the restocking system 314a/314b and determining (based on the sensor input data) a count or estimate of a quantity of that item in the corresponding storage channel 1500 of the automated retail store system 106. The stock level of each item in the automated retail store system 106 is periodically sent to the automated retail store management system 108 (e.g. in a response message).

2. When the stock level information from an automated retail store system 106 indicates that an item needs to be restocked (e.g. the stock level of that item falls below a threshold stock level), the automated retail store management system 108 generates and sends a restock request to the supply warehouse for that item.

3. The supply warehouse will fill "restock" courier containers 902 with a quantity of the item for restocking the automated retail store system 106. There may be different quantities of different restock items placed in the same "restock" courier container 902. Each "restock" courier container 902 preferably associated with a unique container identifier (e.g. a unique barcode). Preferably, each restock item in the "restock" courier container 902 is known to the automated retail store management system 108. The quantity and frequency of checking stock levels and restocking is preferably determined by the automated retail store management system 108.

4. A courier (informed via an application on a courier client device 114) is directed to deliver the "restock"
courier containers 902 to the corresponding automated retail store systems 106 to be restocked.

5. When the courier has arrived at the automated retail store system 106 to be restocked, an identity of the courier is checked and verified against the data stored in the user management system 124 (see step 2202) by the store control system 300 of the automated retail store system 106.

6. Once the courier's identity has been verified, the access barrier to one or more courier locker compartments 308 is configured to unlock and open automatically. The courier will take away any empty or damaged courier containers 902 stored therein (or courier containers 902 containing rejected items) and then place the "restock" courier containers 902 into the accessible courier locker compartments 308 (see step 2204). The courier then configures the access barriers to the courier locker compartments 308 to a closed position, which will then automatically lock.

7. Once all of the "restock" courier containers 902 have been placed into the courier locker compartments 308, and the courier locker compartments 308 are locked, a sensor of the retrieval arm 904 of the conveyor system 310 obtains a unique container identifier (e.g. scans the barcode) of each new "restock" courier container 902 provided to the automated retail store system 106. The store control system 300 records the obtained unique container identifiers together with the location of each container 902 (e.g. in which specific courier locker compartment 308).

8. When the sorting system 312a/312b is available (e.g. not occupied), the conveyor system 310 retrieves one of "restock" courier containers 902 from the courier locker compartment 308 and places it to one of the sorting systems 312a/312b (see step 2206).

9. The sorting system 312a/312b includes one or more sensors (e.g. 3D camera) for scanning the contents of the "restock" courier container 902 to identify items to pickup from that container. In one representative embodiment, the sorting system 312a/312b includes a robotic arm controlled by the store control system 300 to pickup an item from the "restocking" courier container 902 (see step 2208) and move it in front of a barcode reader, which scans a barcode on the item and obtains (based on the barcode) a unique item identifier for that item (see step 2210).

10. The sorting system 312a/312b includes one or more sensors for determining an orientation of the item (see step 2212) which may be used to control how the sorting system 312a/312b picks up the item from the "restock" courier container 902 (e.g. using the robotic arm). The sorting system 312a/312b then provides the item to the restocking system 314a/314b.

11. Based on the unique item identifier for the item, the restocking system 314a/314b is controlled (by the store control system 300 and one or more PLCs) to place the item in a corresponding storage channel 1500 for that item (see step 2214).

12. The sorting system 312a/312b and restocking system 314a/314b will continue picking, identifying and placing items to their respective storage channels 1500 on the storage shelves 316a/316b/318a/318b until the "restock" courier container 902 is empty (see step 2216). The new stock level for the restocked item in the automated retail store system 106 is then updated and reported to the automated retail store management system 108 (see step 2218).

13. The conveyor system 310 then retrieves the empty "restock" courier container 902 from the sorting system 312a/312b and moves it to an available courier locker compartment 308 for the courier to remove next time (step 2220). If there are other "restock" courier container 902 to process, steps 2206 to 2220 are repeated for each of those containers.

Expired Item Removal Process

Figure 23:
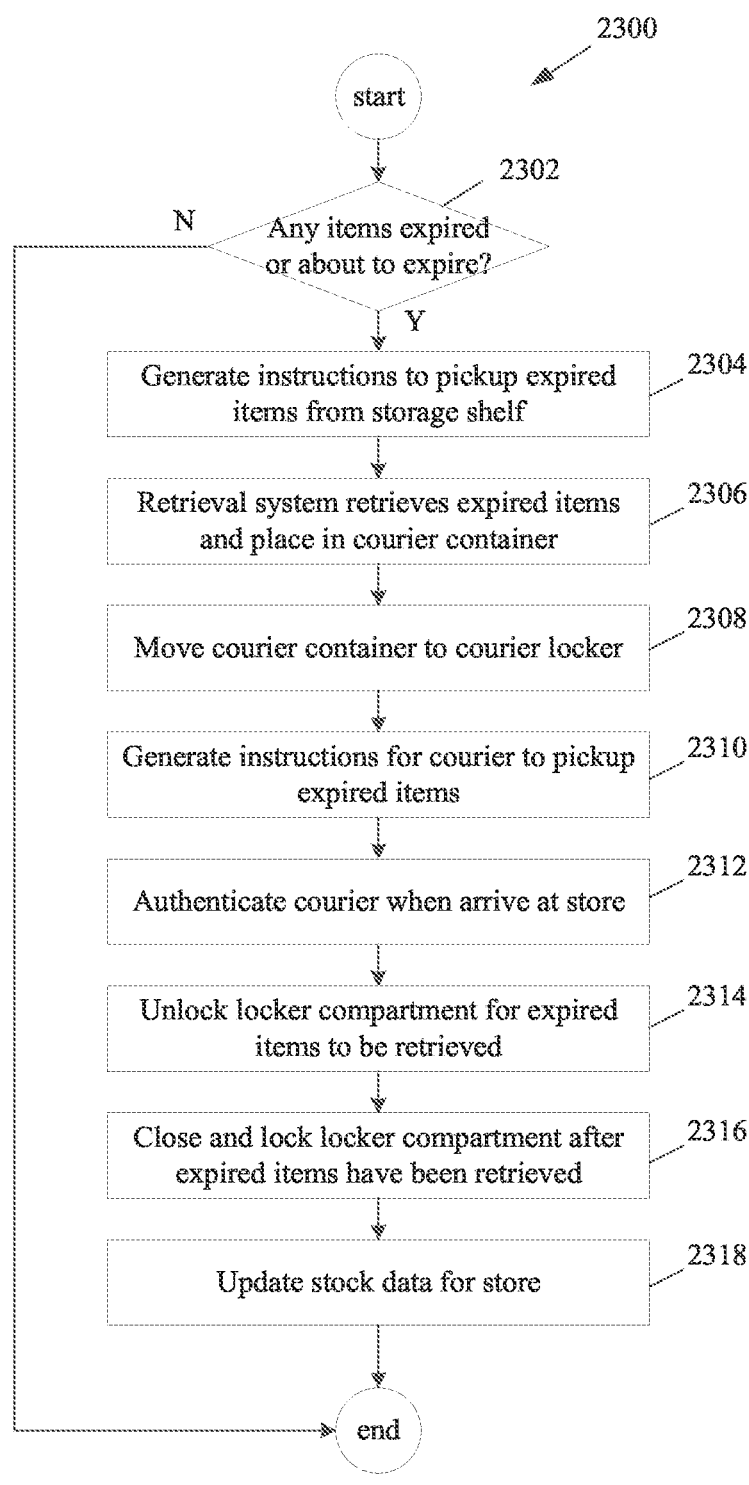
FIG. 23 is a flow chart of an exemplary expired item removal process performed by an automated retail store system.

FIG. 23 is a flow chart of an exemplary expired item removal process 2300 performed by an automated retail store system 106 (under the control of its store control system 300). The store control system 300 may trigger process 2300 to be performed by the automated retail store system 106 on a scheduled or periodic basis. Alternatively, process 2300 may be performed in response to a control message that the store control system 300 receives from the automated retail store management system 108.

Process 2300 begins at step 2302 with the store control system 300 determining whether there are any items in the storage channel 1500 of the storage shelves 316a/316b/318a/318b that have expired or close to expiry. Preferably, an item is treated as expired if the date on which process 2300 is performed is on or after an expiry date of an item stored in the storage shelves 316a/316b/318a/318b Preferably, an item is treated as close to expiry (or about to expire) if the date on which process 2300 is performed is within a predetermined time period (e.g. 30 calendar days) before an expiry date of an item stored in the storage shelves 316a/316b/318a/318b. An expiry date for each item may be determined and stored as part of the restocking process. For example, the sorting system 312a/312b includes sensors (e.g. camera sensors) for obtaining an expiry date (or best before date) marked on each item.

If the sorting system 312a/312b is unable to obtain an expiry date marked on each item, the sorting system 312a/312b attempts to identify what kind of item is being processed from the unique item identifier (e.g. barcode) on the item or based on image recognition performed using image data of the item obtained from a sensor (e.g. camera sensor) of the sorting system 312a/312b. The store control system 300 may then determine an expiry date corresponding to that item (or type of item) based on expiry date data associated with the item, including: (i) a predetermined time period (e.g. 30 calendar days) from the date that the item is stored in the automated retail store system 106 (e.g. based on parameter P4 above); or (ii) information in a database associating different unique item identifiers or item types to an expiry date; or (iii) an expiry date generated or provided by the automated retail store system 106. The store control system 300 then generates expiry date data records representing an expiry date for each item in the sequence as stored in each storage channel 1500 of the automated retail store system 106. Such expiry date data records may be provided to and stored in the automated retail store management system 108. Preferably, if the expiry date data records indicate that a particular item in a storage channel 1500 has expired or is about to expire, all other items in that storage channel 1500 positioned in front of that item are also treated as being expired or about to expire (and therefore will be removed from the automated retail store system 106 as part of process 2300).

If step 2302 determines there are no item that have expired or are about to expire, process 2300 ends. Otherwise, at step 2304, the store control system 300 or automated retail store management system 108 generates (e.g. based on the expiry date data records) instructions for controlling the retrieval arm 1904 of the retrieval system 320 to move to a specific storage channel 1500 containing items that have expired or are about to expire, and to retrieve a number of items from that storage channel 1500 that have been identified as expired or about to expire. At step 2306, the store control system 300 controls the retrieval system 320 to execute the instructions generated at step 2304. The retrieved items are placed in a "reject" courier container in the handover area 322.

At step 2308, the store control system 300 controls the conveyor system 310 to retrieve the "reject" courier container from the handover area 322 and move it to an available courier locker compartment 308 for a courier to pickup and return to the supply warehouse for further processing. At step 2310, the store control system 300 notifies the automated retail store management system 108 that there are items to be picked up from the automated retail store system 106, and the automated retail store management system 108 generates and sends appropriate messages to a courier client device 114 to direct a courier to pickup such items from the specified automated retail store system 106.

At step 2312, then the courier arrives at the specified automated retail store system 106. The store control system 300 performs a verification process (e.g. with the user management system 124) to verify an identity of the courier. At step 2314, after an identity of the courier has been successfully verified, the access barrier to the courier locker compartment 308 containing the "reject" courier container is unlocked and placed in an open position allowing the courier to access the contents of the "reject" courier container stored therein. At step 2316, after the courier has retrieved all of the items in the "reject" courier container and has placed an empty courier container back into the courier locker compartment 308, the access barrier to the courier locker compartment 308 is placed in a closed position and then locked.

At step 2318, the stock information for the specified automated retail store system 106 is updated on the automated retail store management system 108 and IMAX 110 to remove entries relating to the removed items that have expired or are about to expire. Process 2300 ends after step 2318.

Stock Check Process

Figure 24:
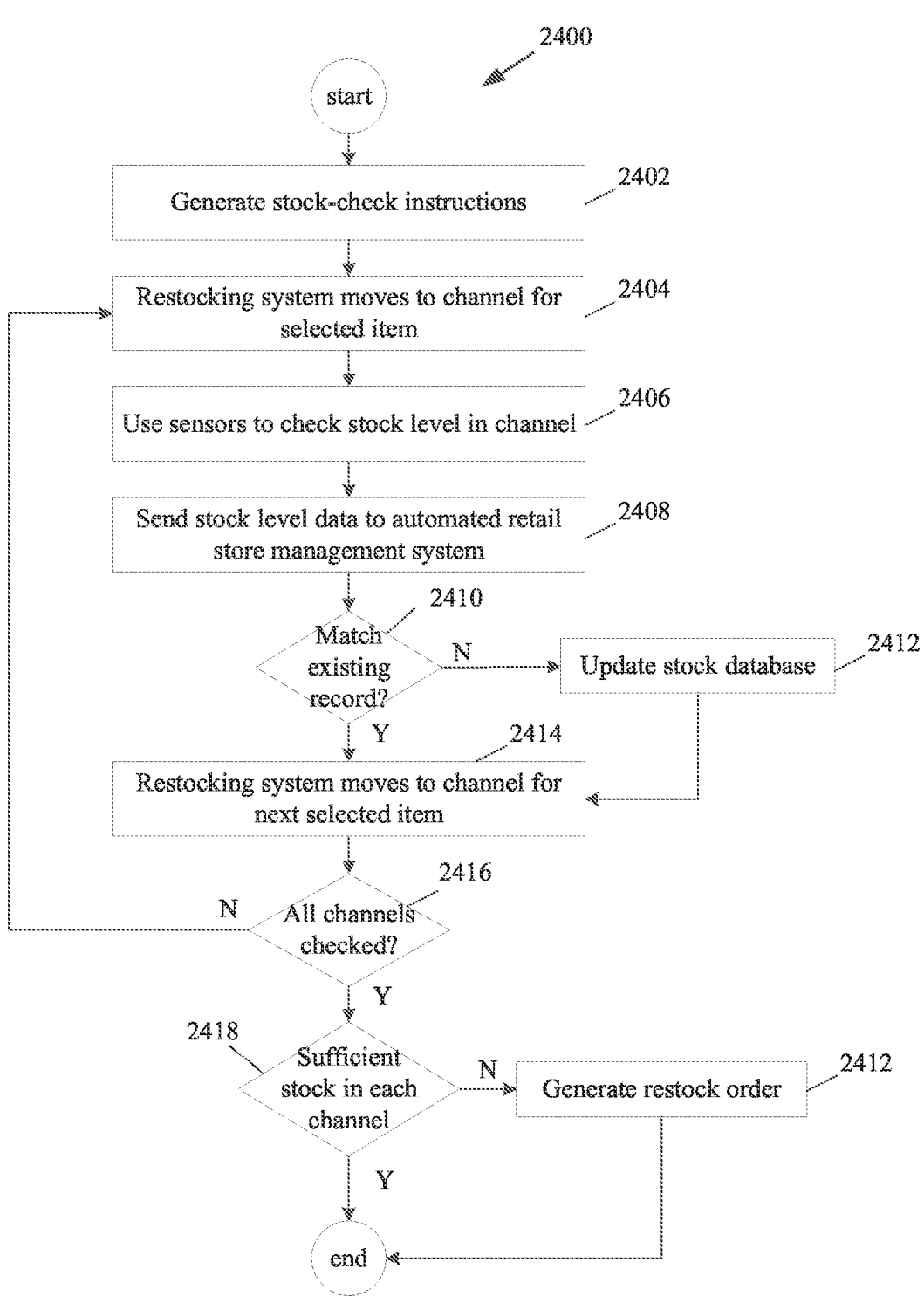
FIG. 24 is a flow chart of an exemplary stock check process performed by an automated retail store system.

FIG. 24 is a flow chart of an exemplary stock check process 2400 performed by an automated retail store system 106 (under the control of its store control system 300). The store control system 300 may trigger process 2400 to be performed by the automated retail store system 106 on a scheduled or periodic basis. Alternatively, process 2400 may be performed in response to a control message that the store control system 300 receives from the automated retail store management system 108.

Process 2400 begins at step 2402 with the store control system 300 or automated retail store management system 108 generating instructions to perform a stock check to determine a quantity of each item stored in the automated retail store system 106. At step 2404, the retrieval arm 1212/1400 of the retrieval system 314a/314b is controlled to move to a selected storage channel 1500 storing a selected item. At step 2406, the sensor input data is obtained from one or more sensors of the retrieval arm 1212/1400 to determine a level of stock (or a quantity of items) in the selected storage channel 1500. For example, step 2406 may obtain sensor input data from a laser sensor representing a distance from the laser sensor to a part of a last item in the selected storage channel 1500, where this distance is used to determine an estimated stock level, quantity or capacity of the selected storage channel (e.g. an extent to which the selected storage channel is full) or an estimated number of items in the storage channel. Alternatively, step 2406 may determine an estimated stock level or quantity of items in the selected storage channel 1500 based on a number of items loaded or placed into the selected storage channel 1500 since the last stock check process (e.g. determined based on sensor input data from sensors of the sorting system 312a/312b and/or sensors of the restocking system 314a/314b) minus a number of such items that have been sold or retrieved from the selected storage channel 1500 since the last stock check process (e.g. determined based on sensor input data from sensors of the retrieval system 320). If an item is stored in more than one storage channel 1500, steps 2404 and 2406 are repeated to determine a total quantity of items stored in all such storage channels 1500.

At step 2408, stock level data representing a quantity of the selected item stored in the automated retail store system 106 (determined based on steps 2404 and 2406) is sent to the automated retail store management system 108 for analysis. At step 2410, the automated retail store management system 108 determines whether the quantity of the selected item received at step 2408 matches a quantity of the selected item as stored in the IMAX 110. If not, at step 2412, the quantity of the selected item in the IMAX 110 is updated based on the stock level data. Otherwise, at step 2414, the store control system 300 or automated retail store management system 108 selects another item to perform a stock check.

At step 2416, if another item is selected at step 2414, steps 2404 to 2414 are repeated in respect of the item selected at step 2414. If step 2416 determines that all storage channel 1500 that store items have been checked, process 2400 proceeds to step 2418 where store control system 300 or automated retail store management system 108 determines whether there is sufficient stock (or a sufficient quantity of items) in each storage channel 1500. This may involve comparing the quantity of each selected item in the relevant storage channels 1500 (e.g. based on one or more of parameters P1, P2 and P3 above) with a corresponding restock threshold quantity corresponding to that item. If the quantity of each selected item is below the restock threshold quantity, a restock order request is generated for restocking a quantity of that selected item associated with the relevant storage channels 1500 at step 2412. Process 2400 ends after steps 2418 and 2412.

Stock Rearrangement Process

Figure 25:
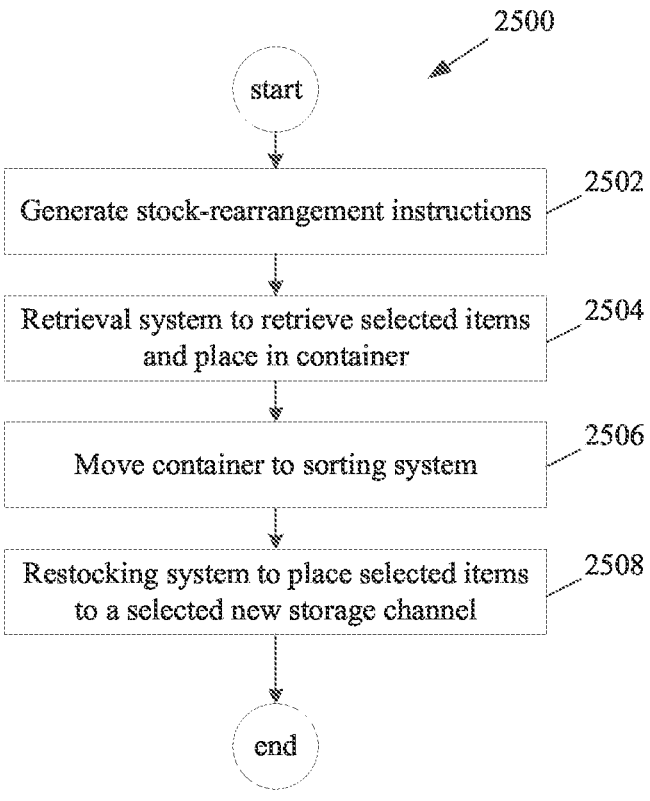
FIG. 25 is a flow chart of an exemplary stock rearrangement process performed by an automated retail store system.

FIG. 25 is a flow chart of an exemplary stock rearrangement process 2500 performed by an automated retail store system 106 (under the control of its store control system 300). Process 2500 may be performed in response to a control message that the store control system 300 receives from the automated retail store management system 108. Process 2500 allows more efficient use of storage channels 1500, and for example, allows the same items in different storage channels to be combined, or move items from one storage channel to another storage channel that is more appropriate for that item.

Process 2500 begins at step 2502 with the automated retail store management system 108 generating instructions for a selected automated retail store system 106 to move the items stored in a source storage channel 1500 to a different target storage channel. These instructions may include a unique identifier for the source storage channel 1500 and the unique identifier for the target storage channel.

At step 2504, the store control system 300 controls the retrieval arm 1904 of the retrieval system 320 to retrieve all items from the source storage channel 1500. The retrieved items are placed in a courier container in the handover area

322. At step 2506, the store control system 300 controls the conveyor system 310 to move the courier container from the handover area 322 to the sorting system 314a/314b. At step 2508, the store control system controls the sorting system 314a/314b to provide each item in the courier container to the restocking system 314a/314b and control the restocking system 314a/314b to load such items into the target storage channel.

In the specification, unless specified otherwise, the terms "comprising", "comprise", and grammatical variants thereof, intended to represent open or inclusive language such that they include the recited elements but also permit inclusion of additional, non-explicitly recited elements.

While this invention has been described with reference to exemplary embodiments, it will be understood by those skilled in the art that various changes can be made and equivalents may be substituted for elements thereof, without departing from the spirit and scope of the invention. In addition, modification may be made to adapt the teachings of the invention to particular situations and materials, without departing from the essential scope of the invention. Thus, the invention is not limited to the particular examples that are disclosed in this specification, but encompasses all embodiments falling within the scope of the appended claims.

The invention claimed is:

1. An automated retail store system for providing automated storage of multiple items and scheduled handling of a customer order for said items at a single retail site, comprising:

a store control system adapted to operate under the control of control signals generated based on order information for an order by a customer, said order information including information representing one or more items and a pickup time;

a plurality of storage channels for storing different respective items, each storage channel having a loading end and delivery end;

a retrieval system adapted to operate under the control of said store control system to: retrieve said items in said order information from said channels, and place said retrieved items into a delivery container; wherein said retrieval system includes a first positioning apparatus and first retrieval apparatus adapted to operate under the control of said store control system, wherein:

said first positioning apparatus is adapted to move said first retrieval apparatus to a retrieval location in three-dimensional space proximate to a delivery end of a target storage channel of said storage channels for storing said item to be retrieved;

said first retrieval apparatus, when positioned at said retrieval location, is adapted to retrieve one or more of said item from the target storage channel;

said first positioning apparatus is then adapted to move said first retrieval apparatus to a drop-off location in three-dimensional space proximate to said delivery container for said order; and said first retrieval apparatus, when positioned at said drop-off location, is adapted to release said one or more item from the first retrieval apparatus into said delivery container;

a conveyor system adapted to operate under the control of said store control system to: move said delivery container from said drop-off location to either a storage rack or a locker compartment based on said pickup time, and move said delivery container located in said storage rack from said storage rack to an available locker compartment based on said pickup time;

a verification system adapted to operate under the control of said store control system to: verify an identity of said customer or a unique identifier for said order, and allow said customer to access said items in said locker compartment only when said identity or said identifier has been successfully verified; and a restock locker for receiving a restock container containing one or more items;

wherein the conveyor system is adapted to operate under the control of said store control system to move a said restock container from the restock locker to a receiving area of a sorting system;

wherein the sorting system is adapted to operate under the control of said store control system, the sorting system including a second retrieval apparatus for retrieving an item from said restock container in the receiving area of a retrieval area;

wherein said automated retail store system includes a restocking system that includes a second positioning apparatus and a third retrieval apparatus adapted to operate under the control of said store control system, wherein:

said second positioning apparatus is adapted to move said third retrieval apparatus to the retrieval area in three-dimensional space proximate to said sorting system;

said third retrieval apparatus, when positioned at said retrieval area, is adapted to retrieve said item from the retrieval area;

said second positioning apparatus is then adapted to move said third retrieval apparatus to a loading location in three-dimensional space proximate to a loading end of said target storage channel; and said third retrieval apparatus, when positioned at said loading location, is adapted to place said retrieved item into the target storage channel.

2. An automated retail store system according to claim 1, wherein said order information is:

generated based on customer input received by a user interface module of said automated retail store system; or received from a separate computer system or separate user device that communicates with said store control system via a communications network or channel.

3. An automated retail store system according to claim 1, wherein each said storage channel is adapted to store quantities of a particular item, and wherein at least some of said storage channels have different cross-sectional dimensions for storing items of different size, orientation and/or of irregular shape.

4. An automated retail store system according to claim 1, wherein at least some of said storage channels are adapted for storing said items at ambient temperature.

5. An automated retail store system according to claim 1, wherein at least some of said storage channels are located inside an enclosed storage compartment for storing said items in a temperature controlled or refrigerated environment; and wherein external access to the enclosed storage compartment is controlled by one or more access barriers, each said access barrier being adapted to be controlled by said store control system to be moveable between: (i) an open position that defines an opening through which said items can be placed into or retrieved from one or more of said storage channels in said compartment, and (ii) a closed position to form an enclosed storage compartment in which the one or more access barriers resist an escape of temperature controlled or refrigerated air from inside the compartment.

6. An automated retail store system according to claim 1, wherein said first positioning apparatus includes a sensor for obtaining a unique identifier associated with said target storage channel; and wherein said store control system controls the first retrieval apparatus to retrieve one or more of said item from said target storage channel only when the store control system determines that the obtained unique identifier is associated with a storage channel for storing said item to be retrieved.

7. An automated retail store system according to claim 1, including one or more sensors for obtaining information representing or for determining one or more of:

i) a count of a number of said items currently in said channel;

ii) a count of a number of said items added to said channel;

iii) a count of a number of said items retrieved from said channel;

iv) a time at which a particular said item is added to said channel;

v) a time at which a particular said item is retrieved from said channel;

vi) an expiry date for a particular item added to said channel; and vii) a visual representation of a physical condition of said items in a said delivery container.

8. An automated retail store system according to claim 7, wherein said store control system determines a number of said items currently in said channel based on one or more of parameters (i), (ii) and (iii) in claim 7;

wherein, if the determined number of items in said channel is below a predetermined threshold value, said store control system generates a restock request for restocking a quantity of said items associated with said channel.

9. An automated retail store system according to claim 7, wherein said store control system determines an expiry date for each said item stored in said channel based on one or more of parameter (iv) in claim 7 and expiry date data associated with each said item;

wherein, said store control system controls said retrieval system to remove said items from said channel that have expired or are about to expire.

10. An automated retail store system according to claim 7, wherein said store control system determines, based on said visual representation, whether there is a potential physical defect with any of said items in said delivery container.

11. An automated retail store system according to claim 1, including one or more sensors for obtaining proximity data representing a presence of objects or obstacles proximate to said third retrieval apparatus, said store control system being adapted to control or adjust the position of said third retrieval apparatus based on said proximity data.

12. An automated retail store system according to claim 1, wherein said third retrieval apparatus includes a sensor for determining a distance from the sensor to a last item in said target storage channel, wherein said store control system determines, based on said distance, an estimate of a stock level or a quantity of items in said target storage channel.

13. An automated retail store system according to claim 12, wherein if said estimate of a stock level or a quantity of items in said target storage channel is less than a predetermined restock threshold for said channel, said store control system generates a restock request for restocking a quantity of said items associated with said channel.

14. An automated retail store system according to claim 1, wherein said store control system determines an estimate of a stock level or a quantity of items in said target storage channel based on a number of items placed into said target storage channel and a number of items from said target storage channel that have been retrieved or sold.

15. An automated retail store system according to claim 1,
  wherein each said locker compartment includes a storage compartment for receiving at least one said delivery container, and an access barrier for controlling a customer's access to contents of said storage compartment; and
  wherein said access barrier is generally configured in a locked state to prevent customer access to said storage compartment, and said access barrier is configured in an unlocked state to allow customer access to said storage compartment only when said identity of said customer or said unique identifier associated with said order has been successfully verified.

16. A retail site having an automated retail store system as claimed in claim 1.

17. A retail system comprising an automated retail store management system and one or more automated retail store systems as claimed in claim 1, the automated retail store management system including:
  a processor adapted to communicate with the one or more automated retail store systems by sending control signals and receiving response signals via a communications network;
  wherein said control signals include information for controlling one or more operations performed by a particular said automated retail store system; and
  wherein said response signals includes information representing a state, status or request relating to one or more of the operations performed by said automated retail store system.

18. A retail system according to claim 17, wherein said processor is adapted to:
  receive order information for a customer order from an ordering system, said order information including at least unique identifiers for one or more items, a pickup time, and a unique identifier for a said automated retail store system;

determine an availability of said items in said order at the identified automated retail store system;

generate, based on the availability of said items at the identified automated retail store system, one or more said control signals for said identified automated retail store system for retrieving one or more items identified in said order information by said pickup time; and transmit said one or more control signals to the identified automated retail store system.

19. A retail system according to claim 18, wherein said processor is further adapted to:
  determine an availability of one or more of said items in said order at one or more alternative supply locations including at least one of: (i) a supply warehouse, and (ii) another automated retail store system within a predetermined proximity of the identified automated retail store system; and
  generate, based on the determined availability of the remaining said items at said alternative supply locations, suborder information for each of one or more said alternative supply locations, each said additional suborder information including a respective scheduled pickup time set before the pickup time in said order.

20. A retail system according to claim 19, wherein said processor is further adapted to:
  generate delivery instructions for a courier to collect said items retrieved based on said suborder information from the alternative supply locations by the corresponding scheduled pickup time; and
  generate delivery instructions for a courier to load the retrieved items into the identified automated retail store system before the pickup time.

21. A retail system according to claim 17, wherein said processor is adapted to:
  communicate with a restocking system for a supply warehouse in response to receiving a response signal from an automated retail store system representing a request for restocking of one or more items to be restocked, or a response signal from said automated retail store system representing a quantity or level of one or more a particular item in said automated retail store system.

*    *    *    *    *